United States Patent
Nagata et al.

(10) Patent No.: US 9,742,534 B2
(45) Date of Patent: Aug. 22, 2017

(54) RADIO COMMUNICATION METHOD, RADIO COMMUNICATION SYSTEM, RADIO BASE STATION AND USER TERMINAL

(71) Applicant: NTT DOCOMO, INC., Tokyo (JP)

(72) Inventors: Satoshi Nagata, Tokyo (JP); Mingju Li, Beijing (CN); Xiang Yun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 132 days.

(21) Appl. No.: 14/442,260

(22) PCT Filed: Oct. 23, 2013

(86) PCT No.: PCT/JP2013/078656
§ 371 (c)(1),
(2) Date: May 12, 2015

(87) PCT Pub. No.: WO2014/073375
PCT Pub. Date: May 15, 2014

(65) Prior Publication Data
US 2016/0254888 A1    Sep. 1, 2016

(30) Foreign Application Priority Data

Nov. 12, 2012   (JP) .................................. 2012-248789

(51) Int. Cl.
*H04L 5/00* (2006.01)
*H04W 16/28* (2009.01)
(Continued)

(52) U.S. Cl.
CPC .......... *H04L 5/0035* (2013.01); *H04L 5/0051* (2013.01); *H04L 45/745* (2013.01);
(Continued)

(58) Field of Classification Search
CPC ..... H04L 5/0035; H04L 5/005; H04L 72/042; H04L 72/0453; H04L 45/745
See application file for complete search history.

(56) References Cited

U.S. PATENT DOCUMENTS

2011/0310800 A1*   12/2011   Lin ....................... H04W 28/14
                                                                    370/328
2012/0127961 A1*   5/2012   Kawamura ............. H04L 5/001
                                                                    370/335
(Continued)

FOREIGN PATENT DOCUMENTS

WO         2011099612 A1      8/2011

OTHER PUBLICATIONS

Yamindi, Hong, and Wu. "The Approach of the New Downlink Control Information Design for Transmission Mode 10", IEEE-Xplor 978-1-4673-5013-6/13/$31.00. 2013.*

(Continued)

*Primary Examiner* — Warner Wong
(74) *Attorney, Agent, or Firm* — Osha Liang LLP

(57) ABSTRACT

A radio communication system including a plurality of radio base stations and a user terminal that is capable of coordinated multiple point transmission with the plurality of radio base stations is provided, and, in this radio communication system, a radio base station has a generating section that generates parameter information related to downlink signals, a control information generating section that generates downlink control information that includes an indicator to represent specific parameter information, a control section that controls whether or not to configure a bit field for the indicator of the parameter information in the downlink control information, and a transmission section that transmits information as to whether or not the bit field for the
(Continued)

indicator of the parameter information is configured, to the user terminal, by higher layer signaling.

10 Claims, 21 Drawing Sheets

(51) Int. Cl.
*H04W 48/08* (2009.01)
*H04W 72/04* (2009.01)
*H04L 12/741* (2013.01)
*H04W 72/12* (2009.01)

(52) U.S. Cl.
CPC .......... *H04W 16/28* (2013.01); *H04W 48/08* (2013.01); *H04W 72/042* (2013.01); *H04W 72/0453* (2013.01); *H04W 72/1273* (2013.01)

(56) References Cited

U.S. PATENT DOCUMENTS

| | | | | |
|---|---|---|---|---|
| 2012/0236814 A1* | 9/2012 | Nishio | ............... | H04L 5/001 370/329 |
| 2012/0307778 A1* | 12/2012 | Nishio | ............... | H04L 1/0047 370/329 |
| 2013/0044707 A1* | 2/2013 | Chen | ............... | H04W 72/1231 370/329 |
| 2013/0128821 A1* | 5/2013 | Hooli | ............... | H04L 5/0051 370/329 |
| 2013/0142098 A1* | 6/2013 | Kwon | ............... | H04W 52/04 370/311 |
| 2013/0196699 A1* | 8/2013 | Davydov | ............... | H04W 72/0493 455/500 |
| 2013/0279363 A1* | 10/2013 | Huang | ............... | H04L 5/001 370/252 |
| 2013/0301548 A1* | 11/2013 | Etemad | ............... | H04W 76/048 370/329 |
| 2014/0119266 A1* | 5/2014 | Ng | ............... | H04L 1/0061 370/312 |
| 2014/0119321 A1* | 5/2014 | Wang | ............... | H04L 5/0048 370/329 |
| 2014/0126490 A1* | 5/2014 | Chen | ............... | H04L 5/0048 370/329 |
| 2014/0192729 A1* | 7/2014 | Kim | ............... | H04L 5/001 370/329 |
| 2015/0016408 A1* | 1/2015 | Yang | ............... | H04L 5/001 370/330 |
| 2015/0257137 A1* | 9/2015 | Chen | ............... | H04L 5/0048 370/329 |
| 2015/0257138 A1* | 9/2015 | Chen | ............... | H04L 5/0048 370/329 |

OTHER PUBLICATIONS

Alcatel-Lucent et al.; "Details of DCI Format"; 3GPP TSG RAN WG1 Meeting #71, R1-124863; New Orleans, USA; Nov. 12-16, 2012 (4 pages).
Alcatel-Lucent et al.; "Remaining issues of Downlink Control Signalling for CoMP"; 3GPP TSG RAN WG1 Meeting #70, R1-123142; Qingdao, China; Aug. 13-17, 2012 (4 pages).
Extended European Search Report issued in corresponding European Application No. 13852898.9, mailed on Jun. 13, 2016 (8 pages).
ZTE et al.; "Way Forward on downlink control signalling for PDSCH RE mapping"; 3GPP TSG RAN WG1 #70, R1-123880; Qingdao, China; Aug. 13-17, 2012 (3 pages).
Notification of Reasons for Rejection issued in corresponding Japanese Application No. 2012-248789, mailed on May 17, 2016 (10 pages).
Ericsson et al.; "Details of Transmission Mode 9 and 10"; CGPP TSG-RAN WG1 #70bis, R1-124536; San Diego, CA; Oct. 8-12, 2012 (7 pages).
International Search Report in corresponding PCT Application No. PCT/JP2013/078656 mailed Jan. 14, 2014 (1 page).
3GPP TR 25.912 V7.1.0; "3rd Generation Partnership Project; Technical Specification Group Radio Access Network; Feasibility study for evolved Universal Terrestrial Radio Acess (UTRA) and Universal Terrestrial Radio Access Network (UTRAN) (Release 7)"; Sep. 2006 (57 pages).
Office Action issued in corresponding Japanese Application No. 2012-248789, mailed Dec. 15, 2015 (5 pages).
NTT DOCOMO; "Downlink Control Signaling for Rel. 11 CoMP"; 3GPP TSG RAN WG1 Meeting #71, R1-124839; New Orleans, USA; Nov. 12-16, 2012 (4 pages).

* cited by examiner

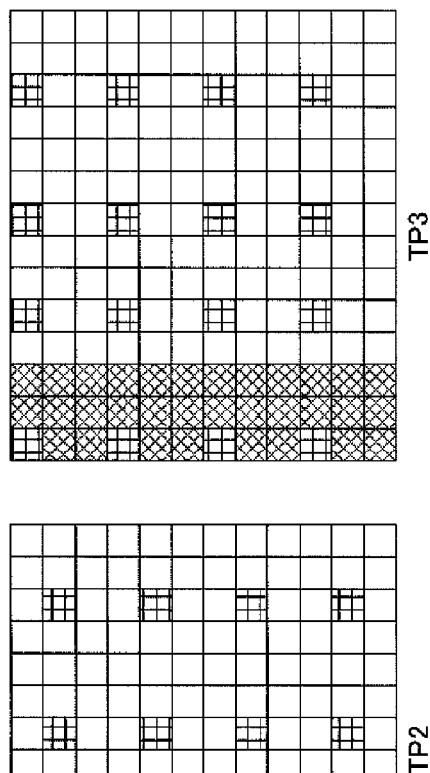
FIG.3C
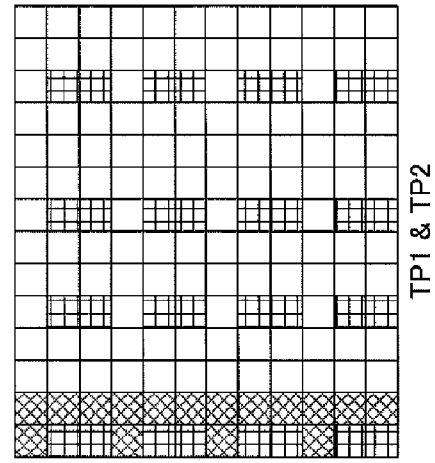
FIG.3B
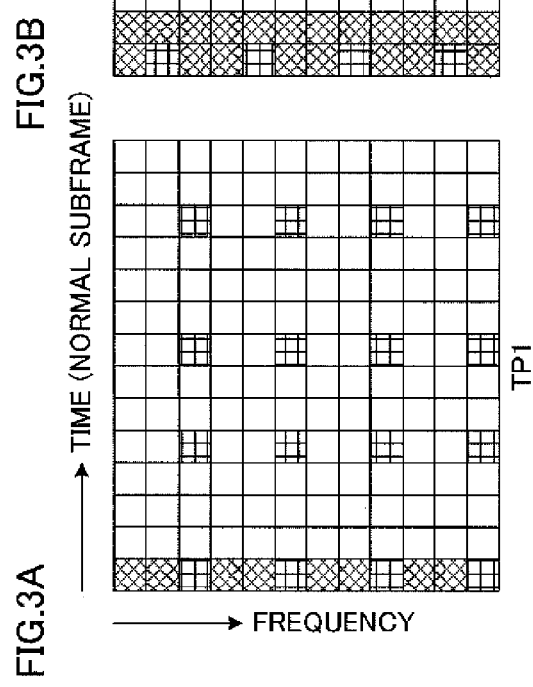
FIG.3D
FIG.3A

TABLE PQI MAPPING TABLE

| DCI: 2 NEW BITS PQI (OR 1 NEW BIT PQI & NSCID) | RRC CONFIGURATION PDSCH RE MAPPING AND QUASI-CO-LOCATION PARAMETERS |
|---|---|
| 00 | PDSCH RE MAPPING AND QUASI-CO-LOCATION CONFIGURATION #1 |
| 01 | PDSCH RE MAPPING AND QUASI-CO-LOCATION CONFIGURATION #2 |
| 10 | PDSCH RE MAPPING AND QUASI-CO-LOCATION CONFIGURATION #3 |
| 11 | PDSCH RE MAPPING AND QUASI-CO-LOCATION CONFIGURATION #4 |

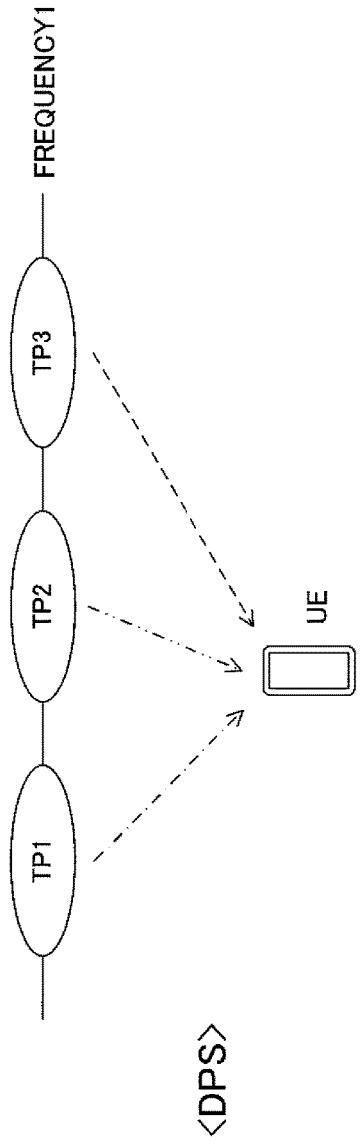

⟨DPS⟩

FIG.5B

| | CRS PATTERN (THE NUMBER OF CRS PORTS AND THE CRS FREQUENCY SHIFT) | MBSFN CONFIG | NZP CSI-RS PATTERN (FOR QUASI-CO-LOCATION) | ZP CSI-RS PATTERN | PDSCH STARTING SYMBOL |
|---|---|---|---|---|---|
| CONFIGURATION #1 | CRS PATTERN 1 | MBSFN CONFIG 1 | NZP CSI-RS PATTERN 1 | ZP CSI-RS PATTERN 1 | PDSCH STARTING SYMBOL 1 |
| CONFIGURATION #2 | CRS PATTERN 2 | MBSFN CONFIG 2 | NZP CSI-RS PATTERN 2 | ZP CSI-RS PATTERN 2 | PDSCH STARTING SYMBOL 2 |
| CONFIGURATION #3 | CRS PATTERN 3 | MBSFN CONFIG 3 | NZP CSI-RS PATTERN 3 | ZP CSI-RS PATTERN 3 | PDSCH STARTING SYMBOL 3 |
| CONFIGURATION #4 | | | | | |

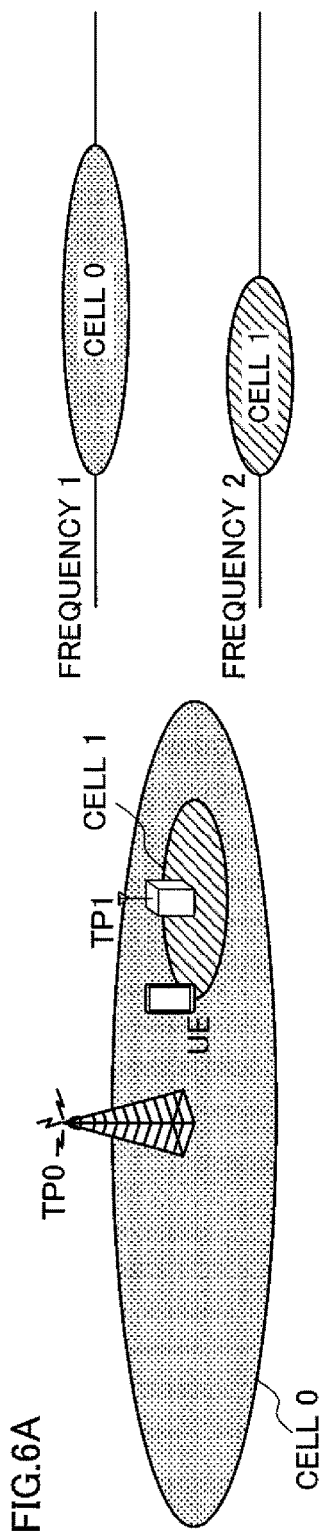
FIG.6A
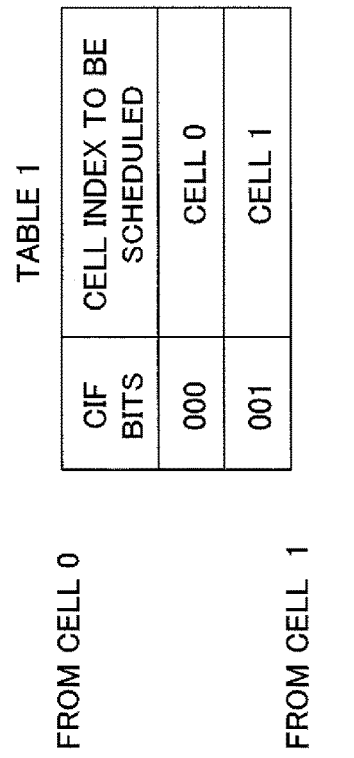
FIG.6C
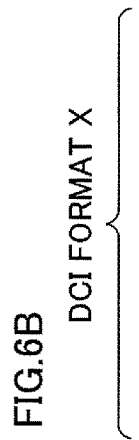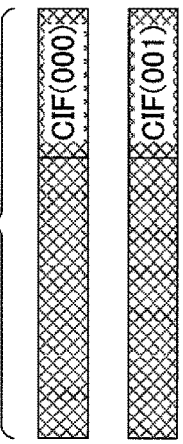
FIG.6B

TABLE PQI IS CONFIGURED ACCORDING TO COMP SCHEME WITHOUT CIF

| | TM | RRC SIGNALING: | | DCI FORMAT |
|---|---|---|---|---|
| | | cif_Presence | pqi_Presence | |
| NO CoMP, NO CIF | TM 10 | FALSE | FALSE | FORMAT 2D WITHOUT PQI WITHOUT CIF |
| CoMP CS/CB WITHOUT CIF | | | | |
| CoMP CS/CB, DPS/DPB, JT WITHOUT CIF | | FALSE | TRUE | FORMAT 2D WITH PQI WITHOUT CIF |

☐ DCI FORMAT 2D WITHOUT PQI WITHOUT CIF

☐ PQI (X OR XX) DCI FORMAT 2D WITH PQI (1OR 2 BITS) WITHOUT CIF

FIG.7

TABLE PQI IS CONFIGURED ACCORDING TO THE NUMBER OF COMP CCS WITH CIF

| | TM | RRC SIGNALING: | | DCI FORMAT |
| --- | --- | --- | --- | --- |
| | | cif_Presence | pqi_Presence | |
| CoMP WITH CIF (Alt. 1, REUSING CIF) | TM 10 | TRUE | FALSE | FORMAT 2D WITHOUT PQI WITH CIF |
| CoMP WITH CIF (Alt. 2, CIF + PQI) | | TRUE | TRUE | FORMAT 2D WITH PQI WITH CIF |

DCI FORMAT 2D WITHOUT PQI WITH CIF  | CIF (XXX) |

DCI FORMAT 2D WITH PQI (1 OR 2 BITS) WITH CIF  | CIF (XXX) | PQI (X OR XX) |

FIG.8

TABLE 2 : CA WITH 5 CCS AND CoMP ON CC0

| CIF | RRC CONFIGURATION | |
|---|---|---|
| | CC INDICATOR | |
| 000 | CC0 | PDSCH RE MAPPING AND QUASI-CO-LOCATION PARAMETERS |
| 001 | CC1 | PDSCH RE MAPPING AND QUASI-CO-LOCATION CONFIGURATION #1 |
| 010 | CC2 | |
| 011 | CC3 | |
| 100 | CC4 | |
| 101 | CC0 | PDSCH RE MAPPING AND QUASI-CO-LOCATION CONFIGURATION #2 |
| 110 | CC0 | PDSCH RE MAPPING AND QUASI-CO-LOCATION CONFIGURATION #3 |
| 111 | CC0 | PDSCH RE MAPPING AND QUASI-CO-LOCATION CONFIGURATION #4 |

FIG.9

TABLE 3 : CA WITH 2 CCS AND CoMP ON 2 CCS

| CIF | CC INDICATOR | RRC CONFIGURATION |
|---|---|---|
| | | PDSCH RE MAPPING AND QUASI-CO-LOCATION PARAMETERS |
| 000 | CC0 | PDSCH RE MAPPING AND QUASI-CO-LOCATION CONFIGURATION #1 OF CC0 |
| 001 | CC0 | PDSCH RE MAPPING AND QUASI-CO-LOCATION CONFIGURATION #2 OF CC0 |
| 010 | CC0 | PDSCH RE MAPPING AND QUASI-CO-LOCATION CONFIGURATION #3 OF CC0 |
| 011 | CC0 | PDSCH RE MAPPING AND QUASI-CO-LOCATION CONFIGURATION #4 OF CC0 |
| 100 | CC1 | PDSCH RE MAPPING AND QUASI-CO-LOCATION CONFIGURATION #1 OF CC1 |
| 101 | CC1 | PDSCH RE MAPPING AND QUASI-CO-LOCATION CONFIGURATION #2 OF CC1 |
| 110 | CC1 | PDSCH RE MAPPING AND QUASI-CO-LOCATION CONFIGURATION #3 OF CC1 |
| 111 | CC1 | PDSCH RE MAPPING AND QUASI-CO-LOCATION CONFIGURATION #4 OF CC1 |

FIG.10

TABLE 4 : CA WITH 5 CCS AND CoMP ON 3 CCS

| CIF | PQI (&NSCID) | RRC CONFIGURATION | |
|---|---|---|---|
| | | CC INDICATOR | PDSCH RE MAPPING AND QUASI-CO-LOCATION PARAMETERS |
| 000 | 00 | CC0 | PDSCH RE MAPPING AND QUASI-CO-LOCATION CONFIGURATION #1 ON CC0 |
| | 01 | CC0 | PDSCH RE MAPPING AND QUASI-CO-LOCATION CONFIGURATION #2 ON CC0 |
| | 10 | CC0 | PDSCH RE MAPPING AND QUASI-CO-LOCATION CONFIGURATION #3 ON CC0 |
| | 11 | CC0 | PDSCH RE MAPPING AND QUASI-CO-LOCATION CONFIGURATION #4 ON CC0 |
| 001 | 00 | CC1 | PDSCH RE MAPPING AND QUASI-CO-LOCATION CONFIGURATION #1 ON CC1 |
| | 01 | CC1 | PDSCH RE MAPPING AND QUASI-CO-LOCATION CONFIGURATION #2 ON CC1 |
| | 10 | CC1 | PDSCH RE MAPPING AND QUASI-CO-LOCATION CONFIGURATION #3 ON CC1 |
| | 11 | CC1 | PDSCH RE MAPPING AND QUASI-CO-LOCATION CONFIGURATION #4 ON CC1 |
| 010 | 00 | CC2 | PDSCH RE MAPPING AND QUASI-CO-LOCATION CONFIGURATION #1 ON CC2 |
| | 01 | CC2 | PDSCH RE MAPPING AND QUASI-CO-LOCATION CONFIGURATION #2 ON CC2 |
| | 10 | CC2 | PDSCH RE MAPPING AND QUASI-CO-LOCATION CONFIGURATION #3 ON CC2 |
| | 11 | CC2 | PDSCH RE MAPPING AND QUASI-CO-LOCATION CONFIGURATION #4 ON CC2 |
| 011 | 00 | CC3 | |
| 100 | 00 | CC4 | |
| ... | | | |

TABLE PQI IS CONFIGURED ACCORDING TO THE CSI PROCESS NUMBER PER CC WITHOUT CIF

| CSI PROCESS NUMBER PER CC | RRC SIGNALING: cif_Presence | RRC SIGNALING: pqi_Presence | DCI FORMAT |
|---|---|---|---|
| 1 | FALSE | FALSE | FORMAT 2D WITHOUT PQI |
| ELSE | FALSE | TRUE | FORMAT 2D WITH PQI |

FIG.12B

TABLE PQI IS CONFIGURED ACCORDING TO THE NUMBER OF CCS WITH MORE THAN 1 CSI PROCESS NUMBER WITH CIF

| THE NUMBER OF CCS WITH MORE THAN 1 CSI PROCESS NUMBER | RRC SIGNALING: cif_Presence | RRC SIGNALING: pqi_Presence | DCI FORMAT |
|---|---|---|---|
| 1 OR 2 CCS | TRUE | FALSE | FORMAT 2D WITHOUT PQI |
| MORE THAN 2 CCS | | TRUE | FORMAT 2D WITH PQI |

TABLE RRC SIGNALING AND DCI FORMAT 2D FOR CoMP

| | RRC SIGNALING: | | DCI FORMAT |
|---|---|---|---|
| | TM | cif_Presence | |
| NO CoMP, NO CIF | TM 10 | FALSE | FORMAT 2D WITHOUT CIF |
| CoMP CS/CB WITHOUT CIF | | | |
| CoMP DPS/DPB, JT WITHOUT CIF | | | |
| CoMP WITH CIF (Alt. 1, REUSING CIF) | | TRUE | FORMAT 2D WITH CIF |
| CoMP WITH CIF (Alt. 2, CIF + PQI) | | | |

FIG.16

RADIO COMMUNICATION METHOD, RADIO COMMUNICATION SYSTEM, RADIO BASE STATION AND USER TERMINAL

TECHNICAL FIELD

The present invention relates to a radio communication method, a radio communication system, a radio base station and a user terminal that are applicable to cellular systems and so on.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, LTE (Long-Term Evolution) is under study for the purposes of further increasing high-speed data rates, providing low delay and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study for the purpose of achieving further broadbandization and higher speed (for example, LTE-advanced ("LTE-A")). The system band of an LTE-A system includes at least one component carrier (CC), where the system band of the LTE system is one unit. Achieving broadbandization by gathering a plurality of components carriers (cells) in this way is referred to as "carrier aggregation" (CA).

Now, as a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonality is established between user terminals UE (User Equipment) in the frequency domain. Meanwhile, between cells, like in W-CDMA, inter-ference randomization by one-cell frequency re-use is fundamental.

So, in the 3GPP (3rd Generation Partnership Project), coordinated multi-point transmission/reception (CoMP) techniques are under study as techniques to realize inter-cell orthogonalization. In this CoMP transmission/reception, a plurality of cells coordinate and perform signal processing for transmission and reception for one user terminal UE or for a plurality of user terminals UE. For example, on the downlink, simultaneous transmission by multiple cells by employing precoding, coordinated scheduling/beam forming and so on are under study. By employing these CoMP transmission/reception techniques, improvement of through-put performance is expected, especially with respect to user terminals UE located on cell edges.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

Up to LTE Rel. 10, a user terminal had only to carry out receiving processes assuming that downlink signals were transmitted from a single radio base station. However, from Rel. 11 onward, accompanying the introduction of the above-noted CoMP techniques and/or the like, there have been transmission modes to transmit downlink signals from a plurality of transmission points to a user terminal.

When downlink signals are transmitted from a plurality of transmission points (radio base stations), a user terminal has to perform rate matching in order to specify the resources (REs) where the data region (PDSCH: Physical Downlink Shared Channel) is allocated. For example, the user terminal has to perform rate matching by taking into account the mapping patterns of downlink control signals (for example, the PDCCH signal) and reference signals (for example, the CRS, the CSI-RS and so on) transmitted from each transmission point.

Also, when downlink signals are transmitted from a plurality of transmission points (radio base stations) to a user terminal separately, cases might occur where each downlink signal shows different characteristics (the received signal level, the received timing, the frequency offset and so on), depending on the position relationships between the user terminal and each transmission point and so on. In such cases, if the user terminal carries out receiving processes such as channel estimation by assuming that the downlink signals are transmitted from a single radio base station as has been the case heretofore, there is a threat that the reliability of reception may decrease.

In this way, when downlink signals are transmitted from a plurality of transmission points to a user terminal, it is necessary to carry out receiving processes on the user terminal side by taking into account the associations/relationships between downlink signals transmitted from each transmission point separately, the mapping pattern of each downlink signal, and so on. In this case, in order to allow the user terminal to carry out receiving processes adequately, a method for adequately reporting the associations/relationships between downlink signals, the mapping pattern of each downlink signal and so on to the user terminal becomes necessary.

The present invention has been made in view of the above, and it is therefore an object of the present invention to provide a radio communication method, a radio communication system, a radio base station and a user terminal, whereby, even when downlink signals are transmitted from a plurality of transmission points to a user terminal, it is possible to adequately report information that is required in receiving processes to the user terminal, and minimize the decrease of the reliability of reception.

Solution to Problem

The radio communication system of the present invention is a radio communication system having a plurality of radio base stations and a user terminal that is capable of coordinated multiple point transmission with the plurality of radio base stations, and, in this radio communication system, the radio base station has: a generating section that generates parameter information related to downlink signals; a control information generating section that generates downlink control information that includes an indicator to represent specific parameter information; a control section that controls whether or not to configure a bit field for the indicator of the parameter information in the downlink control information, and a transmission section that transmits information as to whether or not the bit field for the indicator of the parameter information is configured, to the user terminal, by higher layer signaling.

Advantageous Effects of Invention

According to the present invention, even when downlink signals are transmitted from a plurality of transmission points to a user terminal, it is possible to adequately report information that is required in receiving processes to the user terminal, and minimize the decrease of the reliability of reception.

BRIEF DESCRIPTION OF DRAWINGS

FIG. 3 provides diagrams to show example mapping patterns of CRSs transmitted from each transmission point that uses normal subframes;

FIG. 4 is a diagram of an example of a table that shows parameter information associated with parameter information indicators;

FIG. 5 provides a schematic diagram to show downlink signals transmitted from a plurality of transmission points, and a diagram to explain examples of each parameter information;

FIG. 6 provides diagrams to explain CIFs when cross carrier scheduling is employed in carrier aggregation;

FIG. 7 is a diagram to show an example of a table that lays out whether or not to configure PQI according to the mode of CoMP when CIF is not configured;

FIG. 8 is a diagram to show an example of a table that lays out whether or not to configure PQI according to the number of CoMP CCs when CIF is configured;

FIG. 9 is a diagram to show an example of a table that lays out the relationships between CIF bits, CC indicators, and parameter information;

FIG. 10 is a diagram to show an example of a table that lays out the relationships between CIF bits, CC indicators, and parameter information;

FIG. 11 is a diagram to show an example of a table that lays out the relationships between CIF bits, PQI bits, CC indicators, and parameter information;

FIG. 12 provides diagrams to show examples of a table that lays out whether or not to configure PQI according to the number of CSI processes;

FIG. 16 is a diagram to show an example of a table when the PQI is always configured;

DESCRIPTION OF EMBODIMENTS

Now, an embodiment of the present invention will be described below in detail with reference to the accompanying drawings.

Figure 1A:
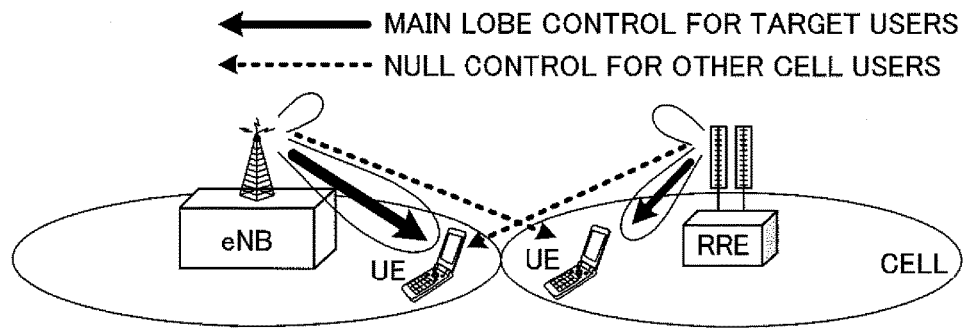
FIG. 1 provides diagrams to explain coordinated multiple point transmission.

First, coordinated multiple point (CoMP) transmission on the downlink will be described with reference to FIG. 1. Downlink CoMP transmission includes coordinated scheduling/coordinated beamforming (CS/CB), and joint processing. CS/CB refers to a method of transmitting a shared data channel (PDSCH) from only one transmission/reception point (or radio base station, cell, etc.) to one user terminal UE, and, as shown in FIG. 1A, allocates radio resources in the frequency/space domain, taking into account interference from other transmission/reception points, interference against other transmission/reception points and so on.

Figure 1B:
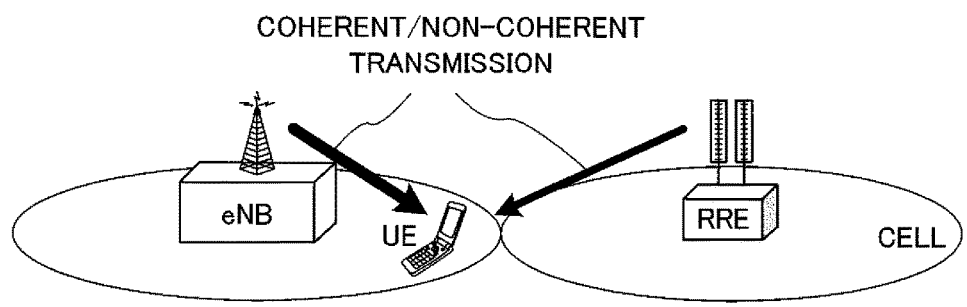
Figure 1C:
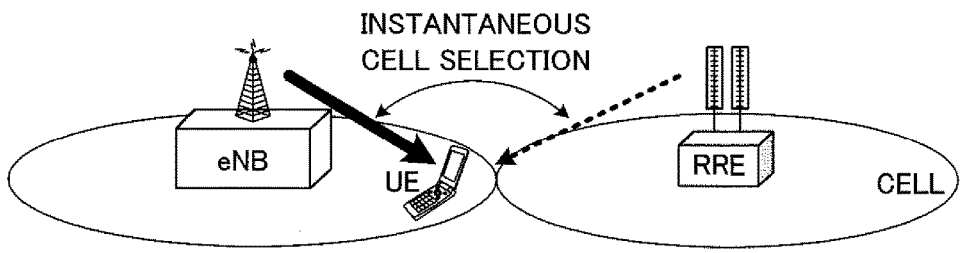

Meanwhile, joint processing refers to a method of transmitting a shared data channel from a plurality of transmission/reception points simultaneously by applying precoding, and includes joint transmission (JT) to transmit a shared data channel from a plurality of transmission/reception points to one user terminal UE as shown in FIG. 1B, and dynamic point selection (DPS) to select one transmission/reception point instantaneously and transmit a shared data channel as shown in FIG. 1C. There is also a transmission mode referred to as "dynamic point blanking (DPB)," which stops data transmission in a certain region with respect to a transmission/reception point that causes interference.

CoMP transmission is employed to improve the throughput of user terminals located on cell edges. Consequently, CoMP transmission is controlled to be applied when there is a user terminal located on a cell edge. In this case, a radio base station apparatus finds differences between the quality information of each cell provided from the user terminal (for example, the RSRP (Reference Signal Received Power)), the RSRQ (Reference Signal Received Quality), the SINR (Signal Interference plus Noise Ratio) and so on, and, when such differences equal or fall below a threshold value—that is, when there is little difference in quality between the cells—decides that the user terminal is located on a cell edge, and applies CoMP transmission.

As for the environment to employ CoMP transmission/reception, there are, for example, a structure to include a plurality of remote radio equipment (RRE) that are connected to a radio base station (radio base station eNB) via optical fiber and/or the like (RRE structure-based centralized control), and a structure of a radio base station (radio base station eNB) (independent base station structure-based autonomous distributed control).

When CoMP is employed, downlink signals (downlink control signals, downlink data signals, synchronization signals, reference signals and so on) are transmitted from a plurality of transmission points or from a specific transmission point, to a user terminal. Upon receiving the downlink signals, the user terminal performs receiving processes by using, for example, the reference signals (cell-specific reference signals (CRSs), user-specific demodulation reference signal (DM-RS), and channel state measurement reference signals (CSI-RSs) and so on). The receiving processes to be carried out by the user terminal include, for example, signal processing such as channel estimation, a synchronization process, a demodulation process, a feedback information (CSI) generation process and so on.

Figure 2A:
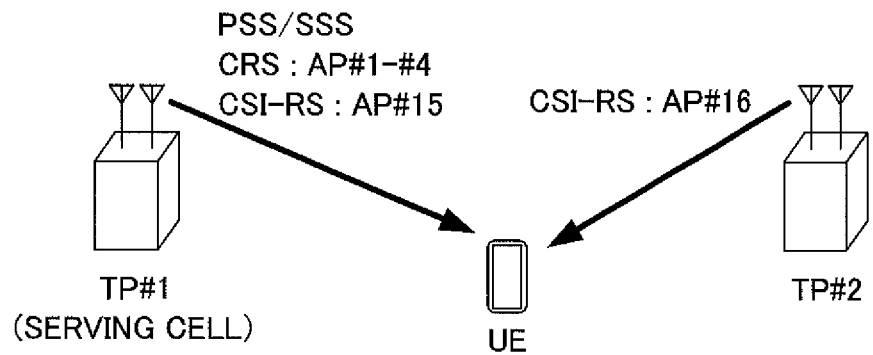
FIG. 2 provides diagrams to explain the received power of downlink signals transmitted from each transmission point in coordinated multiple point transmission.
Figure 2B:
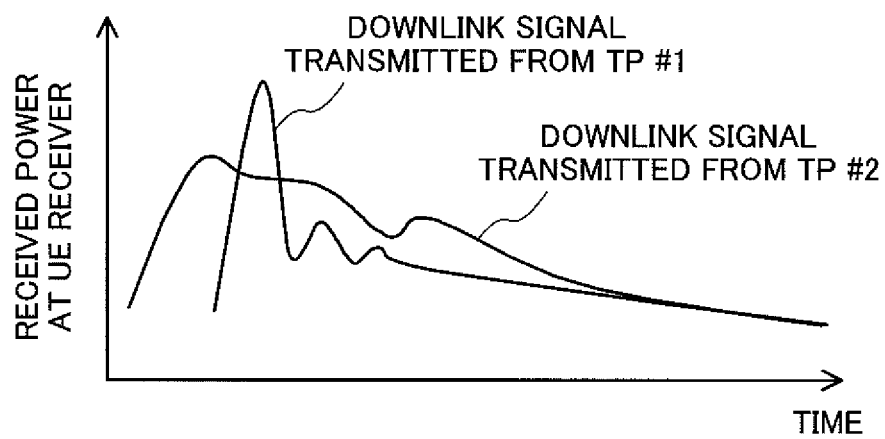

However, when downlink signals are transmitted to a user terminal from a plurality of transmission points that vary in terms of geography, cases might occur where the received signal level, the received timing and so on vary between the downlink signals transmitted from each transmission point (see FIGS. 2A and 2B). The user terminal is unable to know from which transmission point the received downlink signals (for example, reference signals allocated to different antenna ports (APs)) have been each transmitted. If the user terminal carries out channel estimation, the demodulation process and so on by using all the reference signals received, there is a threat that the reliability of reception decreases.

Consequently, when receiving processes are to be carried out using reference signals transmitted from each transmission point, it is preferable that the user terminal carry out the receiving processes by taking into account the geographic location of each transmission point (the transmission path characteristics of downlink signals transmitted from each transmission point). So, a study in progress, in which, when different antenna ports (APs) show the same long-term transmission path characteristics, these antenna ports are assumed to be "quasi-co-located" (geographically the same), and each user terminal performs different receiving processes depending on whether or not quasi-co-location holds between each downlink signal.

The long term transmission path characteristics refer to the delay spread, the Doppler spread, the frequency shift, the average received power, the received timing and so on, and quasi-co-location is assumed to hold when some or all of these are the same. The case where quasi-co-location holds is equivalent to the condition of being "geographically the same," but this is by no means limited to the condition of being "physically close."

For example, when APs that are geographically apart (not quasi-co-located) carry out transmission separately, a user terminal recognizes that transmission has been carried out from APs that are geographically apart, and can perform receiving processes that are different from those in the case quasi-co-location is assumed. To be more specific, APs that are geographically apart each perform receiving processes (for example, signal processing such as channel estimation, the synchronization process, the demodulation process, the feedback information (CSI) generation process and so on) independently.

As one example, assume a case where CRSs are transmitted from APs that are determined to be geographically the same (quasi-co-located), and where CSI-RSs are transmitted from AP #15 and AP #16 that are determined to be geographically apart (not quasi-co-located) (see FIG. 2A). In this case, a user terminal performs receiving processes (measurement) in the same way as heretofore by using the CRSs. Meanwhile, as with the CSI-RSs, the user terminal carries out independent channel estimation for each of AP #15 and AP #16, and, after that, generates channel quality information for each, and feeds these back.

Note that the object that is assumed to be quasi-co-located or not between different APs in a user terminal may be, for example, the PSS/SSS, the CRS, the DM-RS (for the PDSCH), the DM-RS (for the ePDCCH), the CSI-RS and so on.

In this way, according to Rel. 11, it is important to carry out receiving processes, on the user terminal side, by taking into account the association/relationship (quasi-co-location relationship) between each downlink signal.

Also, when downlink signals are transmitted from a plurality of transmission points to a user terminal by CoMP and/or the like, it is preferable that the user terminal specify the resources (REs) where the PDSCH is allocated (that is, perform rate matching), by taking into account the mapping patterns of control signals and reference signals that are transmitted from each transmission point. For example, when transmission is carried out from a plurality of transmission points (TP 1 and TP 2) to a user terminal (for example, JT CoMP), it is preferable that the user terminal perform rate matching by taking into account the mapping patterns of the PDCCH, the CRS and the CSI-RS in TP 1 and TP 2 and so on.

For example, a case will be assumed here where, in a system that is structured so that a user terminal can connect with a plurality of transmission points (TP 1 to TP 3), CoMP (for example, JT CoMP) is employed using TP 1 and TP 2. In this case, the user terminal carries out rate matching by taking into account the mapping patterns of control signals, reference signals and so on that are transmitted separately from each of TP 1 and TP 2 (see FIG. 3). Note that FIGS. 3A to 3C show examples of mapping patterns in normal subframes in TP 1 to TP 3, and FIG. 3D is equivalent to a mapping pattern that takes into account the signals transmitted from TP 1 and TP 2.

When JT CoMP is employed in TP 1 and TP 2, as illustrated in FIG. 3D, PDSCHs are mapped to regions other than the resources where CRSs are mapped, among the radio resources behind predetermined symbols where a downlink control channel is allocated. The user terminal can improve the reliability of receiving processes by performing receiving processes by taking into account the patterns of FIG. 3D. Note that, although FIG. 3 only show CRSs as reference signals, when CSI-RSs are mapped, the CSI-RSs are also taken into account when rate matching is performed.

Also, although FIG. 3 show normal subframes in which CRSs are mapped over the entire frequency band, a study is also in progress to employ MBSFN (Multimedia Broadcast Multicast service Single Frequency Network) subframes and a new carrier type (NCT) as subframe structures.

An MBSFN refers to a scheme, in which a plurality of radio base stations to constitute the MBSFN transmit the same signal together in synchronized transmission, so that a user terminal can RF (Radio frequency)-combine the signals transmitted from each radio base station. An MBSFN subframe is a subframe, in which outside the control channels is an unoccupied space (blank period), and in which no CRS is allocated to the PDSCH region. A new carrier type (also referred to as "extension carrier type") subframe is a subframe, in which no conventional PDCCH that is formed with a predetermined number of OFDM symbols (maximum three OFDM symbols) from the top of the subframe is provided, and in which no CRS is allocated either.

For example, when TP 1 uses normal subframes and TP 2 uses MBSFN subframes (or NCT), no CRS pattern is present in the PDSCH region of TP 2. Consequently, the rate matching pattern of TP 1+TP 2 becomes equal to the rate matching pattern of TP 1. That is, the user terminal can perform rate matching by taking into account only the mapping pattern of the REs for the PDSCH of TP 1 that uses normal subframes.

In this way, by performing rate matching in a user terminal by taking into account the mapping patterns of PDCCHs, CRSs and CSI-RSs transmitted from a plurality of transmission points, the subframe structure and so on, it is possible to specify the PDSCH resources of the serving cell and neighboring cells and carry out receiving processes. That is, from Rel. 11 onward, it is important that a user terminal perform rate matching by taking into account the mapping pattern of PDCCHs, CRSs and CSI-RSs, the subframe structures and so on.

Consequently, a method for reporting, to a user terminal, information that allows the user terminal to perform receiving processes adequately (information about the quasi-co-location relationships, the mapping of PDSCH resources and so on) is necessary.

For example, a study is in progress to prepare a predetermined number of pieces of (for example, four sets of) parameter information (PDSCH RE mapping and quasi-co-location configurations) that lays out PDSCH resource mapping information (PDSCH RE mapping parameter) and quasi-co-location information (quasi-co-location configuration parameter) per component carrier (CC), and report these to user terminals.

To be more specific, on the radio base station (network) side, a predetermined number of pieces of (for example, four kinds of) parameter information, which include PDSCH resource mapping information and quasi-co-location information (hereinafter referred to as "parameter information"), are laid out by taking into account the transmission points and communication environment around a user terminal and so on. The, these multiple pieces of parameter information are reported to the user terminal by higher layer signaling (for example, RRC signaling). Furthermore, a study to include a command for allowing a user terminal to select a specific piece of parameter information from four kinds of parameter information #1 to #4 in downlink control information (DCI) and report this downlink control information to the user terminal dynamically is in progress (see FIG. 4).

That is, parameter information #1 to #4 (PDSCH RE mapping and quasi-co-location configurations #1 to #4) shown in FIG. 4 are reported to a user terminal by higher layer signaling, and, furthermore, bit information ("00," "01," "10" or "11") that corresponds to each piece of parameter information is included in downlink control information (DCI) and reported to the user terminal.

Now, examples of parameter information that includes PDSCH resource mapping information and quasi-co-location information will be described with reference to FIG. 5. FIG. 5A shows a case where DPS CoMP to select one transmission/reception point instantaneously from a plurality of transmission/reception points (here, three of TP 1, TP 2 and TP 3) and transmit a shared data channel is employed. The network dynamically selects one transmission point (radio base station) and transmits a data signal to the user terminal.

For example, in the DPS CoMP illustrated in FIG. 5A, it is possible to transmit a data signal from transmission point TP 1 to the user terminal in subframe #1, transmit a data signal from transmission point TP 2 to the user terminal in subframe #2, and transmit a data signal from transmission point TP 3 to the user terminal in subframe #3.

Also, FIG. 5B shows examples of parameter information (configurations), where parameter information #1, #2 and #3 (configurations #1, #2 and #3) correspond to the parameters of TP 1, TP 2 and TP 3, respectively. Also, parameter information #1 to #3 are reported to the user terminal via higher layer signaling (for example, RRC signaling).

In FIG. 5, in the CRS pattern, the number of antennas ports and the amount of shift for CRSs are included. By this means, it is possible to specify the mapping pattern of CRSs. The MBSFN configuration (MBSFN config) is equivalent to the configuration of the MBSFN, and whether or not a CRS pattern is present in the PDSCH region can be decided from the MBSFN configuration. The non-zero power CSI-RS (NZP CSI-RS) is a reference signal that can be used to estimate desired signals, and, by reporting the non-zero power CSI-RS pattern (NZP CSI-RS pattern) to the user terminal, the quasi-co-location relationship of the CSI-RS and the DM-RS can be decided. The zero power CSI-RS (ZP CSI-RS) is a reference signal that can be used to estimate interference signals, and the PDSCH is not multiplexed thereupon. By reporting the zero power CSI-RS pattern (ZP CSI-RS pattern) to the user terminal, rate matching can be carried out adequately. The PDSCH starting symbol is a parameter to indicate the top symbol where the PDSCH is placed. By this means, the user terminal can specify the top symbols of neighboring cells' PDSCHs. Note that the parameter information of FIG. 5 is only examples, and these are by no means limiting.

Also, the indicators to designate the parameter information (PDSCH RE mapping and quasi-co-location configurations) shown in FIG. 5B may also be referred to as "PQIs" (PDSCH RE mapping and quasi-co-location Indicators). The PQIs are included in downlink control information (DCI) and reported to the user terminal. For example, as noted earlier, when data is transmitted from TP 0 to the user terminal in subframe #1, the user terminal is reported to employ parameter information #1 through downlink control information. For example, when the parameter information and the PQIs assume the relationships shown in FIG. 4, the PQI to be configured in the DCI is "00."

Also, a study is in progress to newly provide a "DCI format 2D" as downlink control information (DCI) for configuring PQIs is under study. Also, DCI format 2D is studied as a DCI format to use in a CoMP transmission mode (TM 10) as well. Also, a study is in progress to configure four sets of parameter information for every one CC by using DCI format 2D.

For example, as illustrated in FIG. 4, when four kinds of parameter information are set, the PQIs can be represented in two bits. In this case, the method of combining a newly added one bit and a conventional DCI format information element (for example, the scrambling identity) and make the PQIs two bits, or the method of adding two new bits may be employed.

Note that the number of PQI bits depends on the number of parameter information, and, when four kinds (configurations #1 to #4) are configured as illustrated in FIG. 4, the number of bits to be required for the PQIs becomes two. Note that the number of PQI bits is by no means limited to two bits with the present embodiment. For example, when eight kinds of parameter information are configured, the number of PQI bits can be made three bits. In this case, too, the above methods may be employed for the PQIs (the method of adding one bit or two bits newly+combining this with a predetermined information element, or the method of adding three new bits).

Now, when carrier aggregation (CA) is employed, for example, as illustrated in FIGS. 6A and 6B, it is possible to multiplex and transmit downlink control information for the PUSCH that is transmitted in transmission point TP 1 (cell 1), upon the PDCCH of another transmission point TP 0 (cell 0) (cross carrier scheduling). At this time, in order to identify which transmission point's PDSCH each downlink control information corresponds to, a DCI format to add a CIF (Carrier Indicator Field) for configuring carrier indicators (CIs) (or CC indicators) is employed (see FIGS. 6B and 6C). FIG. 6C shows a table that lays out the relationships between CIF bits and CC indicators (hereinafter referred to as "Table 1").

That is, the CIF is the field to show carrier indicators (CIs), and, when cross carrier scheduling is executed, a user terminal can specify the cell (CC) where the PDSCH to be demodulated is multiplexed, based on the bits defined in the CIF. Note that the number of CIF bits is determined by taking into account the number of CCs to which CA is applied, and, when CA with up to five CCs is assumed, the number of CIF bits is three bits.

On the other hand, when cross carrier scheduling is not executed, it is possible to reduce the number of downlink control information bits by not adding the CIF to DCI (by making the CIF zero bits). Consequently, the network (radio base station) can control whether or not to add three bits for the CIF to DCI depending on whether or not cross carrier scheduling is applied, and, furthermore, report information as to whether or not DCI is configured, to the user terminal, by higher layer signaling (for example, RRC signaling).

To be more specific, it is possible to define "cif-Presence" as a BOOLEAN (fundamental data format to assume the two values of "true" and "false") to show whether or not a three-bit CIF is present in DCI, in the information element for the cross carrier scheduling configuration (cross carrier scheduling config information element), and report this to the user terminal by RRC signaling.

Also, up to maximum five CCs are supported at present as the number of CCs in CA, so that, among the three-bit indicators of the CIF, five values are required, and the remaining three values are not used. That is, the remaining three values can be used for other pieces of information. So, the present inventors have focused on the use of the CIF when configuring PQIs in downlink control information (DCI) and reporting predetermined parameter information.

For example, when the CIF is not attached to downlink control information (DCI) (cif_Presence: False), a new bit field for the PQI is configured in the DCI (for example, DCI format 2D). In this case, as noted earlier, the method of adding one new bit for the PQI and combining this with a conventional DCI format information element (for example, the scrambling identity (Nscid)), or the method of adding two new bits for the PQI may be used. For example, it is possible to use, as DCI format 2D, the format in which bits for the PQI are added to conventional DCI format 2C.

On the other hand, when the CIF is added to downlink control information (cif_Presence: True), it may be possible to use the CIF bits as a parameter information indicator (reusing CIF only (Alt. 1)), and configure both the bit field (CIF) for the CC indicator and the bit field for the PQI (CIF+PQI (Alt. 2)).

In the event of Alt. 1 (reusing CIF), the CIF is, as originally meant to be, used as a CC indicator, and, furthermore, part of the CIF is used as a parameter information indicator, or the CIF is, as originally meant to be, used as an indicator to represent parameter information, instead of using the CIF as a CC indicator. That is, part or whole of the CIF is used as a substitute for the PQI. Also, when up to four kinds of parameter information are defined per CC by using a three-bit CIF, it is possible to support maximum two CCs as CCs to use CoMP.

In the event of Alt. 2 (CIF+PQI), the CIF is used as a CC indicator, as originally meant to be, and, furthermore, a new bit field for the PQI is configured. In this case, if up to four kinds of parameter information are configured per CC by using three-bit CIFs and two-bit PQIs, maximum five CCs can be supported as CCs to use CoMP. Note that, when adding a bit field for the PQI, it is possible to use the method of adding one new bit for the PQI and combining this with a conventional DCI format information element (for example, Nscid), and the method of adding two new bits for the PQI.

As noted earlier, the present inventors have conceived of controlling the method of signaling the indicators that represent parameter information, based on the mode of communication with user terminals (whether or not CoMP transmission is used, the transmission format, the number of CCs to employ CoMP, whether or not the CIF is configured, and so on). To be more specific, the network (radio base station) side, whether or not to configure the bit field for the PQI is controlled based on the mode of communication with user terminals, and whether or not the bit field for the PQI is configured is signaled to the user terminals.

Also, in relationship to this case, the present inventors have arrived at newly defining "pqi-Presence," as a BOOLEAN (fundamental data format to assume the two values of "true" and "false") to indicate whether or not a one-bit or two-bit bit field for the PQI is present in DCI, and reporting whether or not the PQI is configured to the user terminals by RRC signaling.

Also, the present inventors have conceived of allowing a user terminal to select a predetermined table from a plurality of tables that lay out the contents represented by the CIF bits, based on predetermined conditions, so that, when part or all of the CIF bits are used as a parameter information indicator, the content represented by the CIF can be adequately identified on the user terminal side.

Now, a case will be described below where whether or not the PQI field is configured is controlled depending on the mode of communication with user terminals.

First Example

With a first example, with reference to FIG. 7, a case will be described where, when the CIF is not configured in downlink control information (DCI) (cif_Presence: False), a radio base station controls whether or not to configure the PQI in the DCI (pqi_Presence: True/False) depending on whether or not CoMP is employed, the mode of CoMP (CoMP scheme), and so on.

When CoMP is not applied to a user terminal, the user terminal does not need parameter information that includes PDSCH resource mapping information and quasi-co-location information. Consequently, if CoMP is not employed, the PQI is controlled not to be configured in DCI (for example, DCI format 2D), and, furthermore, information in which the bit field for the PQI is not configured (pqi_Presence: False) is reported to the user terminal by higher layer signaling (for example, RRC signaling).

Also, even when CoMP is applied to a user terminal, cases might occur where parameter information is not needed in the user terminal if CS/CB is the mode of CoMP. In this case, too, similar to when CoMP is not employed, information in which the PQI is not configured (pqi_Presence: False) is reported to the user terminal by higher layer signaling (for example, RRC signaling).

On the other hand, when CoMP is applied to a user terminal and parameter information is needed in the user terminal (CS/CB, DPS/DPB or JT), the PQI is controlled to be configured in DCI (for example, DCI format 2D). Then, in this case, information in which the field for the PQI is configured (pqi_Presence: True) is reported from the radio base station (transmission point) to the user terminal by higher layer signaling (for example, RRC signaling).

Note that, even when CS/CB CoMP is employed, if cooperation with DPS and JT CoMP is taken into consideration, it is possible to configure four kinds of parameter information and report these to the user terminal by higher layer signaling. In this case, the field for the PQI is configured (pqi_Presence: True).

Also, when the PQI is configured in DCI, it is possible to configure the PQI in part of the CCs (for example, in CC1) in a plurality of CCs that carry out CoMP, and not configure the PQI in the rest of the CCs (for example, in CC2).

In this way, by controlling whether or not to configure the PQI in DCI (pqi_Presence: True/False) depending on whether or not CoMP is applied and the mode of CoMP, it is possible to configure a new bit field in DCI only when the PQI is needed, so that it is possible to use DCI resources effectively.

Second Example

With a second example, with reference to FIG. 8, a case will be described where, when the CIF is configured in downlink control information (DCI) (cif_Presence: True), a radio base station controls whether or not to configure the PQI (pqi_Presence: True/False) in DCI depending the number of CCs (cells) that are subject to CoMP transmission, and the method of reporting parameter information.

To be more specific, when the number of CCs that apply CoMP to user terminals is equal to or lower than a predetermined number, the CIF bits are used as a parameter information indicator (Alt. 1, reusing CIF), and, when the number of such CCs is greater than the predetermined number, a bit field (CIF) for the CC indicator and a bit field for the PQI are both configured (Alt. 2, CIF+PQI). In this way, it is possible to reduce the overhead of downlink control information by deciding whether or not to configure the bit field for the PQI depending on the number of CCs.

For example, when CoMP and CA are used in one CC (four sets) or two CCs (four sets×2), it is possible to define indicators that represent parameter information in DCI by using the CIF. That is, since the CIF can be used for the PQI, the PQI bit field is controlled not to be configured in DCI (for example, DCI format 2D). In this case, information in which the PQI is not configured (pqi_Presence: False) is reported from the radio base station to the user terminal by higher layer signaling (for example, RRC signaling).

In cases apart from the above (when CoMP and CA are used in three or more CCs), the PQI is controlled to be configured in DCI. In this case, information in which the PQI is configured (pqi_Presence: True) is reported from the radio base station to the user terminal by higher layer signaling (for example, RRC signaling).

Next, examples of associations/relationships between the CIF, the PQIs and parameter information to be reported by higher layer signaling when the number of CCs (cells) to carry out CoMP transmission is one, two and three will be described with reference to FIGS. 9 to 11.

FIG. 9 shows a table (hereinafter also referred to as "Table 2") that lays out the relationships between the CIF bits, the CC indicator and the parameter information when CA is carried out in five CCs and also CoMP is employed in one CC (here, CC0).

As illustrated in FIG. 9, when one CC employs CoMP, the parameter information (four sets) for CC0 can be laid out using the blank space of the CIF. In FIG. 9, "001," "010," "011" and "100" in the CIF correspond to the CC indicators of CC1, CC2, CC3 and CC4, respectively, "000," "101," "110," "111" in the CIF are the indicators of CC0, and, furthermore, correspond to parameter information #1 to #4 of CC0, respectively.

In this way, when the CIF is configured in downlink control information (cif_Presence: True), if the number of CCs (cells) to carry out CoMP is one, it is possible to report parameter information by using the blank space of the CIF. In this case, the PQI bit field is controlled not to be configured (pqi_Presence: False). By this means, even when reporting parameter information, it is not necessary to add a new bit field in downlink control information, so that it is possible to save the number of downlink control information bits.

FIG. 10 shows a table (hereinafter referred to as "Table 3") that lays out the relationships between the CIF bits, CC indicators and parameter information when CA is carried out in two CCs (here, CC0 and CC1) and CoMP is employed in two CCs.

As illustrated in FIG. 10, when CoMP is employed in two CCs, it is possible to lay out the parameter information for each of CC0 and CC1 (for example, four sets×2) by using the CIF. In FIG. 10, "000," "001," "010" and "011" in the CIF correspond to parameter information #1 to #4 of CC0, respectively, and "100," "101," "110" and "111" in the CIF correspond to parameter information #1 to #4 of CC1, respectively.

In this way, when the CIF is configured in downlink control information (cif_Presence: True), it is possible to configure each CC's parameter information by using the CIF, if the number of CCs (cells) to carry out CoMP transmission and the number of CCs to employ CA are two. In this case, too, even when reporting parameter information, it is not necessary to add a new bit field in downlink control information, so that it is possible to save the number of downlink control information bits.

FIG. 11 shows a table (hereinafter also referred to as "Table 4") that lays out the relationships between the CIF bits, the PQI bits, CC indicators and parameter information when CA is carried out in five CCs and CoMP is employed in three or more CCs (here, three of CC0, CC1 and CC2).

As illustrated in FIG. 11, when CoMP is employed in three or more CCs, the bit field for the PQI is configured, and each CC's parameter information is reported to user terminals. In this case, it is possible to lay out the parameter information for each CC (four sets×3) by using the CIF bits (for example, three bits) and the PQI bits (two bits). In FIG. 11, "000," "001," "010," "011" and "100" in the CIF correspond to CC0, CC1, CC2, CC3 and CC4, respectively, and "00," "01," "10" and "11" of the PQI correspond to parameter information #1 to #4 of each CC, respectively.

In this way, when the CIF is configured in downlink control information (cif_Presence: True), it is possible to report each CC's parameter information to a user terminal by configuring a new bit field for the PQI (pqi_Presence: True) if the number of CCs (cells) to carry out CoMP transmission is three. By this means, the user terminal can perform receiving processes adequately based on the downlink control information.

Third Example

With a third example, with reference to FIG. 12, a case will be described where whether or not to configure the PQI field in DCI (pqi_Presence: True/False) is controlled depending on the number of CSI processes (CSI process number). Note that the number of CSI processes refers to the number of pieces of CSI that a user terminal can feed back in one subframe. The number of CSI processes is controlled on a per CC basis, and the higher the performance of a user terminal, the greater the number of CSI processes can be made.

When the CIF is not attached to downlink control information (cif_Presence: False), if the number of CSI processes in a CC is one, it is likely that the performance of the user terminal is low and the possibility of applying CoMP is low. Consequently, it is not necessary to report parameter information to the user terminal, so that the PQI is controlled not to be configured in DCI (for example, DCI format 2D) (see FIG. 12A). In this case, information in which the PQI field is not configured (pqi_Presence: False) is reported from the radio base station (transmission point) to the user terminal by higher layer signaling (for example, RRC signaling).

On the other hand, when the number of CSI processes in a CC is two or greater, it may be possible to apply CoMP to a user terminal, so that the PQI bit field is controlled to be configured in DCI (for example, DCI format 2D) (see FIG. 12A). In this case, information in which the PQI bit field is configured (pqi_Presence: True) is reported from the radio base station to the user terminal by higher layer signaling (for example, RRC signaling).

Also, it is equally possible to configure the PQI in part of the CCs (for example, CC1) among a plurality of CCs, and not configure the PQI in the other CCs (for example, CC2).

When the CIF is attached to downlink control information (cif_Presence: True), whether or not to configure the PQI field in the DCI (pqi_Presence: True/False) is controlled depending on the number of CCs with more than one CSI process (two or more CSI processes). When the number of CCs with two or more CSI processes is two or less, it is possible to lay out parameter information by using the CIF as illustrated in FIG. 9 and FIG. 10 above (pqi_Presence: False), and report this to the user terminal (see FIG. 12B). On the other hand, when the number of CCs with two or more CSI processes is three or greater, a new bit field for the PQI is controlled to be configured in the DCI (for example, DCI format 2D) (pqi_Presence: True) and reported to the user terminal (see FIG. 12B).

In this way, it is possible to adequately control the number of downlink control information (DCI) bits depending on the mode of communication with user terminals, by controlling whether or not to attach the field for the PQI to DCI depending on the number of CSI processes in CCs. By this means, it is possible to reduce the increase of the overhead of DCI, and also report each CC's parameter information to user terminals adequately.

(Operation of User Terminals)

As described above, a radio base station (transmission point) controls whether or not to configure the field for the PQI based on the mode of communication with user terminals (based on, for example, at least one of whether or not CoMP is applied, the mode of CoMP transmission, the number of CoMP CCs, and whether or not the CIF is configured). Meanwhile, a user terminal can determine predetermined parameter information based on parameter information, downlink control information (for example, DCI format 2D), information as to whether or not the PQI filed is configured (pqi_Presence: True/False), which are reported from the radio base station, and carry out receiving processes.

Meanwhile, when, as mentioned earlier, the CIF is attached to downlink control information (cif_Presence: True), cases might occur where the content which the CIF represents varies depending on the mode of communication. To be more specific, there are the case where the CIF bits are, as have been heretofore, used only as indicators to designate predetermined CCs (Table 1 of FIG. 6C), the case where the CIF bits are used as parameter information (PQI) indicators (reusing CIF, Table 2 of FIG. 9 and Table 3 of FIG. 10), and the case where the CIF and the PQI are configured and used (CIF+PQI and Table 4 of FIG. 11).

For example, when CoMP is not employed (CA only) as the mode of communication between user terminals and a radio base station, the CIF is used as an indicator that only designates a predetermined CC (Table 1). Also, when CoMP is employed in two or fewer CCs as the mode of communication between user terminals and a radio base station, the CIF is used as an indicator of parameter information for the CoMP CCs (reusing CIF). Also, when CoMP is employed in three or more CCs, the CIF is used as a CC indicator, and, furthermore, combined with the PQI, used as an indicator of the parameter information of each CC (using CIF+PQI).

In this way, the CIF represents varying contents in tables that correspond to respective modes of communication, so that the user terminals need to decide what the CIF contained in a downlink control signal that is received represents (for example, the content of which table among Tables 1 to 4 the received downlink control signal matches), and carry out receiving processes.

So, with the present embodiment, the user terminal selects a predetermined table based on whether or not the PQI is configured, the number of CSI processes, the transmission mode (TM), or the state of PDSCH resource mapping as reported by RRC (parameter information), and carry out receiving processes.

Now, the method of selecting tables in user terminals will be described below. Note that, in the following description, a case will be described where a user terminal selects a predetermined table from four kinds of tables—namely, Table 1 of FIG. 6C, Table 2 of FIG. 9, Table 3 of FIG. 10 and Table 4 of FIG. 11. Note that the contents of these tables are only examples, and the number and contents of the tables which user terminals use are by no means limited to these.

Based on Whether the PQI is Present or not

Figure 13A:
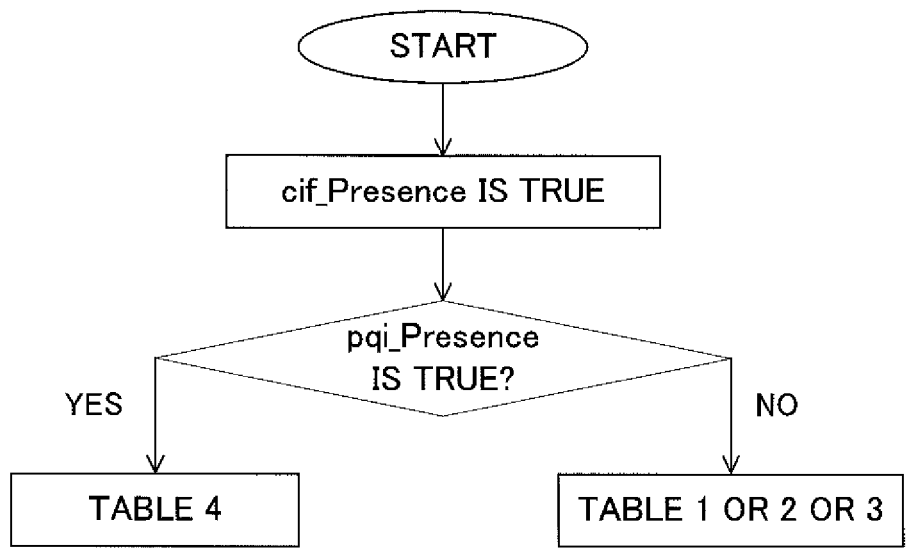
FIG. 13 provides diagrams to explain example table selection methods in a user terminal.

For example, when the PQI is configured in DCI (pqi_Presence: True), a user terminal uses Table 4 of FIG. 11 (see FIG. 13A). In this case, the CIF corresponds to a CC indicator, and, combined with the PQI, is used as an indicator to represent each cell's parameter information.

Also, when the PQI is not configured in DCI (pqi_Presence: False), the user terminal uses one of Tables 1 to 3 based on whether or not CoMP is applied, the number of CoMP CCs and so on. Note that whether or not the PQI is configured can be reported from a radio base station to user terminals by RRC signaling.

Based on the Transmission Mode (TM)

Figure 13B:
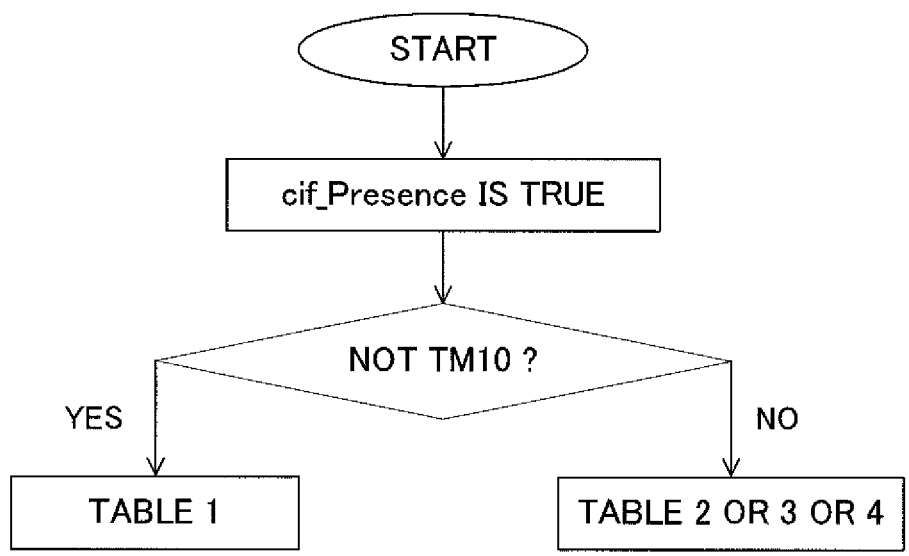

When the transmission mode is not a transmission mode (TM10) that is defined for CoMP, the CIF is used only as a CC indicator as has been heretofore, so that a user terminal selects Table 1 (see FIG. 13B). On the other hand, when the mode of transmission is a transmission mode (TM10) that is defined for CoMP, the user terminal uses one of Tables 2 to 4 based on the number of CoMP CCs and so on.

Based on the Number of CSI Processes (CSI Process Number)

Figure 14A:
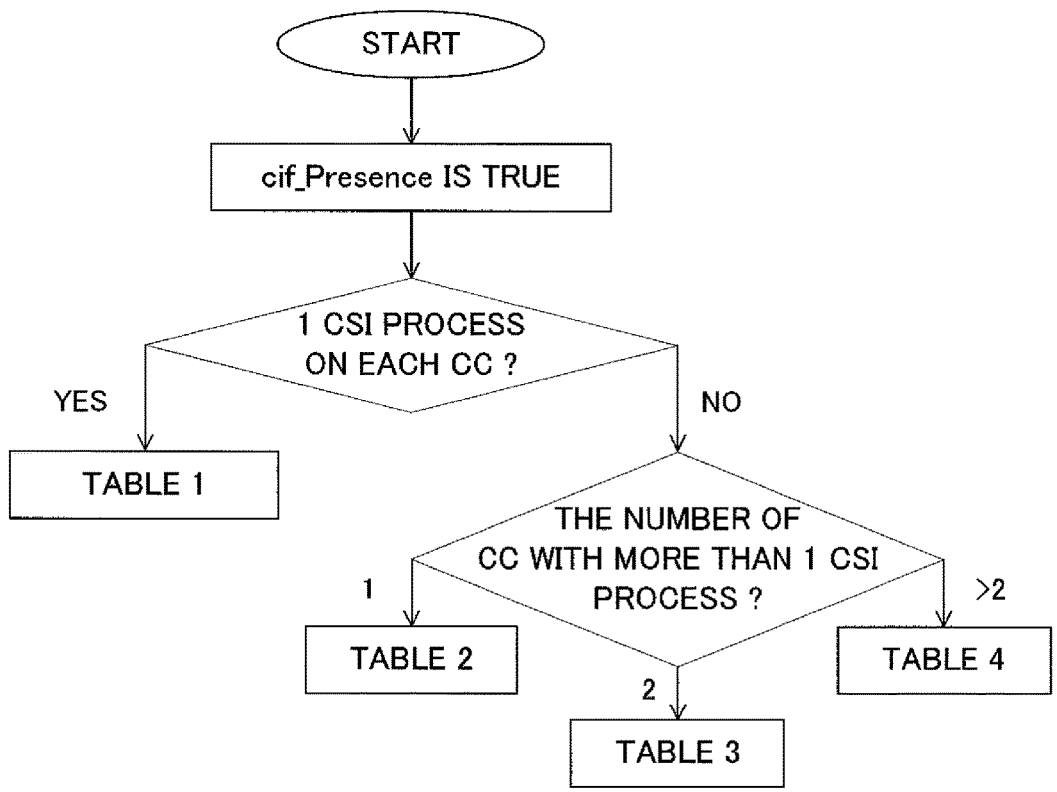
FIG. 14 provides diagrams to explain example table selection methods in a user terminal.

When the number of CSI processes in each CC is one, CoMP is not likely to be applied, and therefore a user terminal uses Table 1 (see FIG. 14). On the other hand, when the number of CSI processes is two or greater, the user terminal uses one table among Tables 2 to 4.

When the number of CSI processes is two or greater, if four kinds of parameter information (four states) are needed in CS/CB CoMP, it is possible to select one of Tables 2 and 3 as adequate, depending on the number of CCs that employ CoMP. For example, it is possible to select Table 2 when there is one CC with two or more CSI processes, select Table 3 when there are two such CCs, and select Table 4 when there are three or more such CCs (see FIG. 14A).

In CS/CB CoMP, data is transmitted to a user terminal always from the serving transmission point, so that the user terminal has only to know the parameter information of the serving cell (one state). However, when cooperation with DPS and JT CoMP is taken into consideration, even in CS/CB, it is possible to configure four kinds of parameter information. Note that, in this case, it is possible to make parameter information #1 to #4 to be reported by RRC the same as each other. Also, as for the indicators of parameter information to report in DCI, four kinds are needed (for example, "00," "01," "10" and "11" in FIG. 4).

Figure 14B:
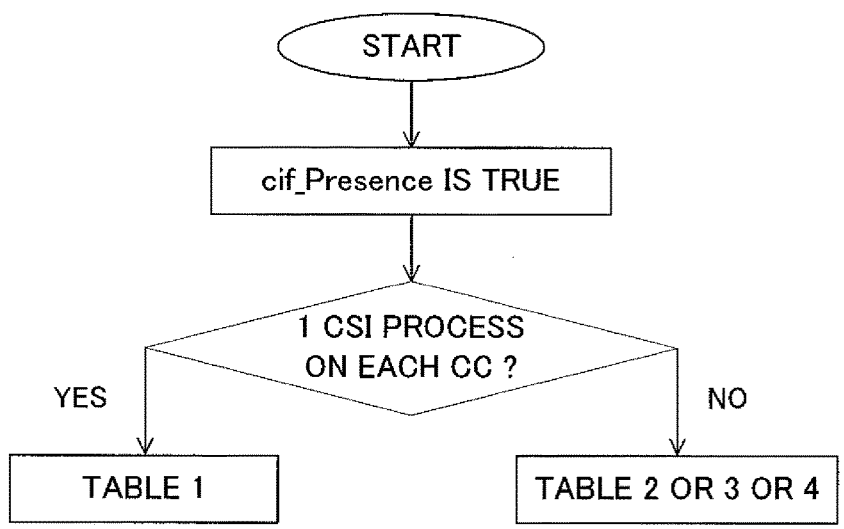

On the other hand, when the number of CSI processes is two or greater, if one kind of parameter information (one state) suffices in CS/CB CoMP, one of Tables 2 to 4 can be selected (see FIG. 14B). In this case, although the parameter information varies between CS/CB CoMP and DPS or JT CoMP, this is unrecognized on the user terminal side.

Figure 15:
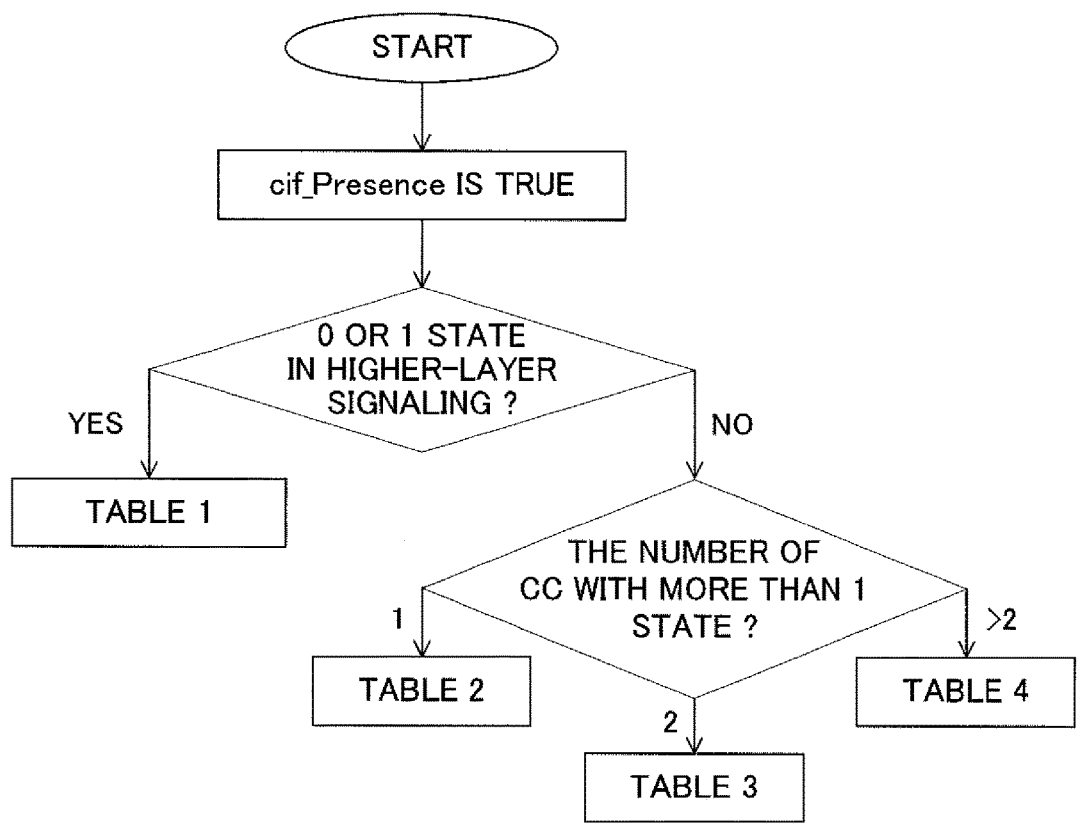
FIG. 15 is a diagram to explain an example table selection method in a user terminal.

Based on the PDSCH resource mapping state reported by higher layer signaling (based on higher-layer signaling of PDSCH RE mapping states) When, for each CC, there is zero or only one PDSCH resource mapping state (parameter information), CoMP is unlikely to be applied, and therefore a user terminal selects Table 1 (see FIG. 15). On the other hand, when there are two or more pieces of parameter information for each CC, it is possible to select a table as adequate depending on the number of CCs. For example, it is possible to select Table 2 when there is one CC with two or more pieces of parameter information, select Table 3 when there are two such CCs, and select Table 4 when there are three or more such CCs.

In this way, even when parameter information is reported using the CIF that is configured in downlink control information, a user terminal can carry out receiving processes adequately by selecting tables in which the associations between the CIF and parameter information are laid out, based on predetermined conditions.

Other Examples

Note that, although cases have been described with the above first example to the third example where whether or not to configure the PQI in DCI (for example, DCI format 2D) is controlled depending on the mode of communication between a radio base station and user terminals, the present embodiment is by no means limited to this. For example, it is equally possible to employ a structure to configure (fix) the PQI in DCI at all times (fix the PQI in DCI) (see FIG. 16).

When the CIF is attached to downlink control information (cif_Presence: True), it is possible to use the CIF bits as a parameter information indicator (reusing CIF only (Alt. 1)), and configure both a bit field for the CC indicator (CIF) and a bit field for the PQI (CIF+PQI (Alt. 2)).

(Application to Other DCI Formats)

Note that, although DCI format 2D has been described as an example of the downlink control information format in the above description, the present embodiment is by no means limited to this. It is equally possible to configure the PQI in other DCI formats (for example, DCI formats 0, 1, 1A, 1B, 1D, 2, 2A, 2B, 2C and 4) (CIF+PQI), or use the CIF as an indicator of parameter information (use for the PQI) (reusing CIF).

In this case, as shown with the above first example to the third example, it is possible employ a structure to control whether or not to configure the PQI in DCI (pqi_Presence: True/False) in a radio base station (network side), and report this to user terminals. In this case, in the above description (for example, FIG. 7, FIG. 8, FIG. 12 and so on), it is possible to replace format 2D with other formats (for example, DCI formats 0, 1, 1A, 1B, 1D, 2, 2A, 2B, 2C and 4).

(Structure of Radio Communication System)

Figure 17:
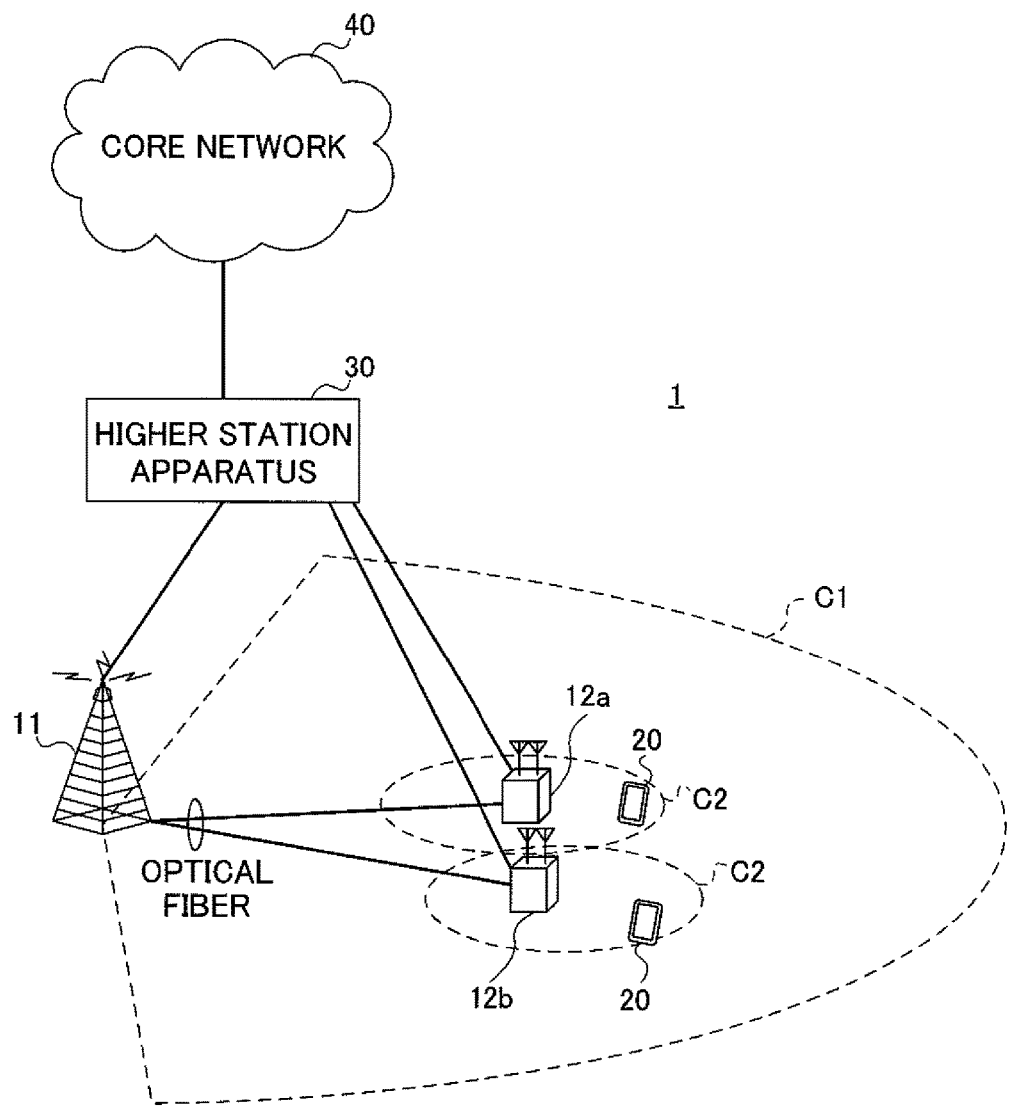
FIG. 17 is a diagram to explain a system structure of a radio communication system.

FIG. 17 is a schematic structure diagram of a radio communication system according to the present embodiment. Note that the radio communication system shown in FIG. 17 is a system to accommodate, for example, the LTE system or SUPER 3G. This radio communication system employs carrier aggregation, whereby a plurality of fundamental frequency blocks (component carriers) are grouped into one, by using the system bandwidth of the LTE system as one unit. Also, this radio communication system may be referred to as "IMT-advanced," or may be referred to as "4G" or "FRA (Future Radio Access)."

As shown in FIG. 10, the radio communication system 1 has a radio base station 11 that forms a macro cell C1, and radio base stations 12a and 12b that are placed in the macro cell C1 and that form small cells C2, which are narrower than the macro cell C1. Also, user terminals 20 are placed in the macro cell C1 and in each small cell C2. The user terminals 20 are configured to be able to perform radio communication with both of the radio base stations 11 and 12.

Communication between the user terminals 20 and the radio base station 11 is carried out using a carrier of a relatively low frequency band (for example, the 2 GHz band) and a wide bandwidth (referred to as, for example, a "conventional carrier," a "legacy carrier" and so on). Meanwhile, communication between the user terminals 20 and the radio base stations 12 may be carried out using a carrier of a relatively high frequency band (for example, the 3.5 GHz band) and a narrow bandwidth, or may be carried out using the same carrier as that used with the radio base station 11. The radio base station 11 and each radio base station 12 are connected by wire connection or by wireless connection.

The radio base station 11 and the radio base stations 12 are each connected with a higher station apparatus 30, and are connected to a core network 40 via the higher station apparatus 30. The higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNB (eNodeB)," a "radio base station apparatus," a "transmission point" and so on. Also, the radio base stations 12 are radio base stations having local coverages, and may be referred to as "pico base stations," "femto base stations," "Home eNodeBs," "RRHs (Remote Radio Heads)," "micro base stations," "transmission points" and so on. Now, the radio base stations 11 and 12 will be collectively referred to as the "radio base station 10" unless distinction needs to be drawn. Each user terminal 20 is a terminal that supports various communication schemes such as LTE, LTE-A and so on, and is by no means limited to a mobile communication terminal and can be a fixed communication terminal as well.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Here, communication channels to be used in the radio communication system 1 shown in FIG. 17 will be described. Downlink communication channels include a PDSCH (Physical Downlink Shared Channel), which is used by each user terminal 20 on a shared basis, and downlink L1/L2 control channels (PDCCH, PCFICH, PHICH and enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel). Also, scheduling information for the PDSCH and the PUSCH and so on may be transmitted by the enhanced PDCCH (referred to as, for example, an "enhanced physical downlink control channel," an "ePDCCH," an "E-PDCCH," an "FDM-type PDCCH," a "UE-PDCCH" and so on). This enhanced PDCCH (enhanced downlink control channel) is frequency-division-multiplexed with the PDSCH (downlink shared data channel), and used to cover the shortage of the capacity of the PDCCH.

Uplink communication channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are transmitted by this PUSCH. Also, by means of the PUCCH, downlink radio quality information (CQI: Channel Quality Indicator), ACK/NACK and so on are transmitted.

Figure 18:
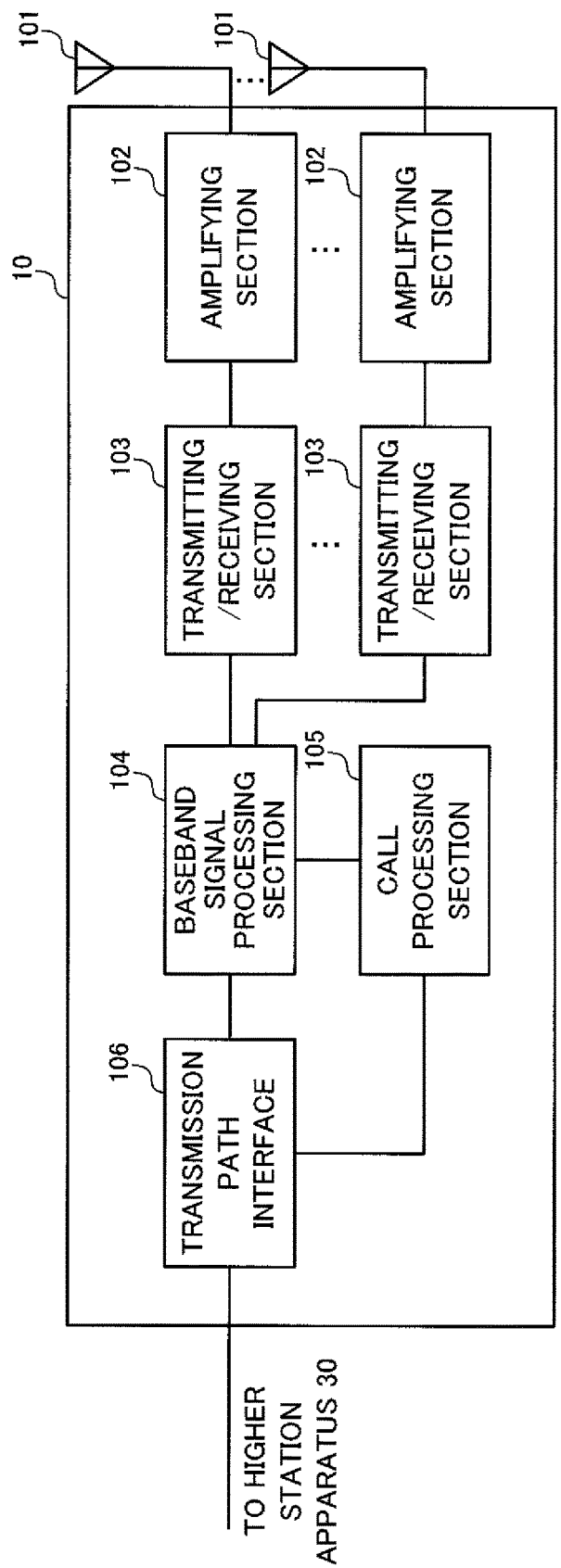
FIG. 18 is a diagram to explain an overall structure of a radio base station.

FIG. 18 is a block diagram to show an overall structure of a radio base station 10 (which covers both the radio base stations 11 and 12) according to the present embodiment. The radio base stations 10 have a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminals 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the results are transferred to each transmitting/receiving section 103. Furthermore, downlink control channel signals are also subjected to transmission processes such as channel coding and an IFFT process, and transferred to each transmitting/receiving section 103.

Also, the baseband signal processing section 104 reports, to the user terminals 20, control information for allowing communication in the cells, through a broadcast channel. The information for allowing communication in the cells includes, for example, the uplink or downlink system bandwidth and so on.

Each transmitting/receiving section 103 converts the baseband signals that are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101. Note that a transmitting/receiving section 103 functions as a transmission section that transmits parameter information (PDSCH RE mapping and quasi-co-location configuration), CIF and PQI configuration information (cif_Presence, pqi_Presence), downlink control information (DCI) and so on to a user terminal.

Meanwhile, as for data to be transmitted from the user terminals 20 to the radio base station 10 on the uplink, radio frequency signals that are received in each transmitting/receiving antenna 101 are each amplified in the amplifying sections 102, converted into baseband signals in the transmitting/receiving sections 103 through frequency conversion in each transmitting/receiving section 103, and input in the baseband signals processing section 104.

In the baseband signal processing section 104, the user data that is included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 19:
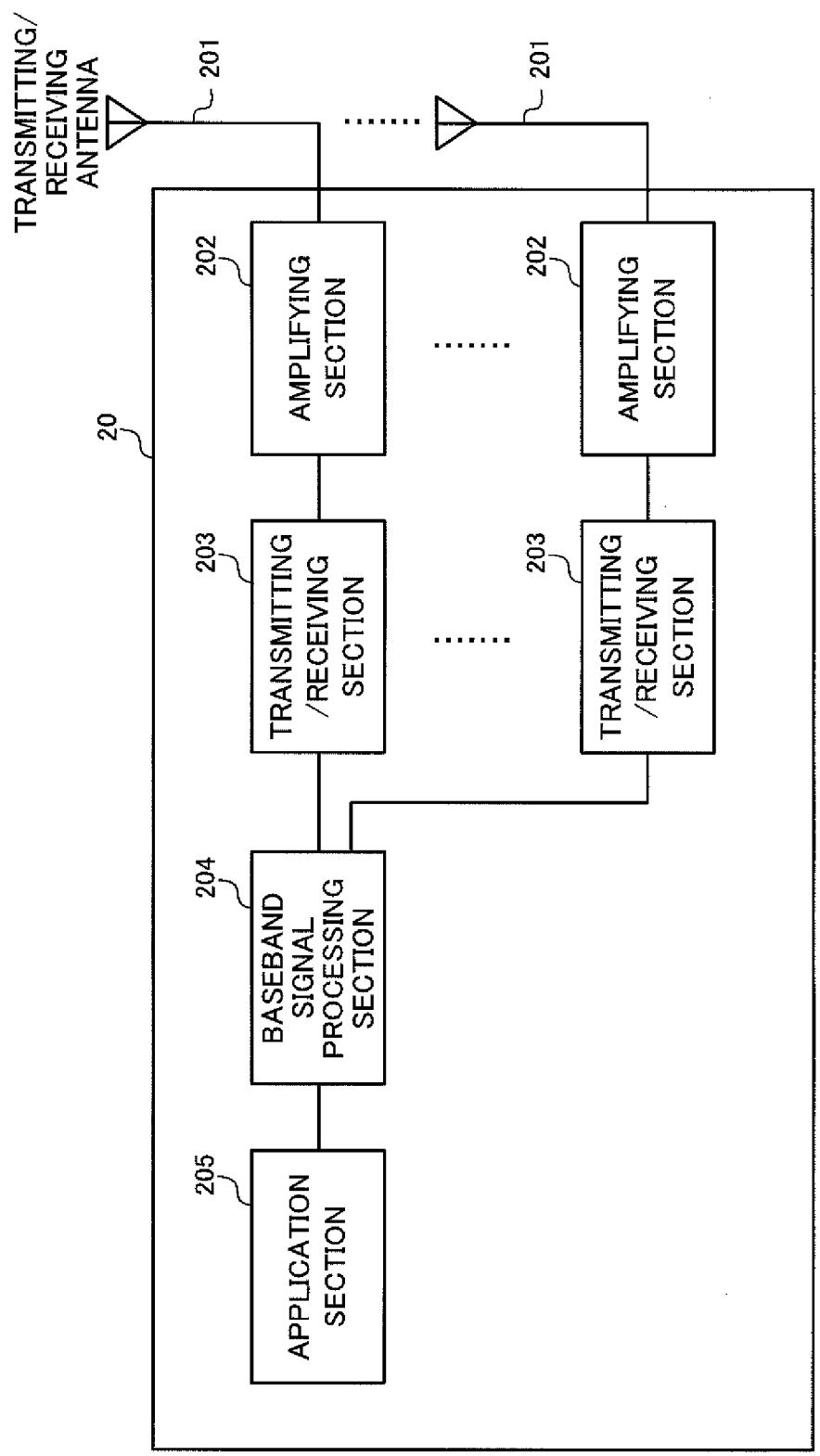
FIG. 19 is a diagram to explain an overall structure of a user terminal.

FIG. 19 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving section) 203, a baseband signal processing section 204, and an application section 205.

As for downlink data, radio frequency signals that are received in the plurality of transmitting/receiving antennas 201 are each amplified in the amplifying sections 202 and converted into baseband signals through frequency conversion in the transmitting/receiving sections 203. The baseband signals are subjected to an FFT process, error correction decoding and a retransmission control receiving process in the baseband signal processing section 204. The downlink user data that is included in this downlink data is transferred to the application section 205. The application section 205 performs processes related to higher layers above the physical layer and the MAC layer. Also, the broadcast information that is included in the downlink data is also transferred to the application section 205.

Meanwhile, uplink user data is input from the application section 205 to the baseband signal processing section 204. In the baseband signal processing section 204, the user data that is input is subjected to a retransmission control (H-ARQ (Hybrid ARQ)) transmission process, channel coding, precoding, a DFT process, an IFFT process and so on, and then transferred to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

A transmitting/receiving section 203 functions as a receiving section to receive parameter information (PDSCH RE mapping and quasi-co-location configuration), CIF and PQI configuration information (cif_Presence, pqi_Presence), downlink control information (DCI) and so on that are reported from the radio base station.

Figure 20:
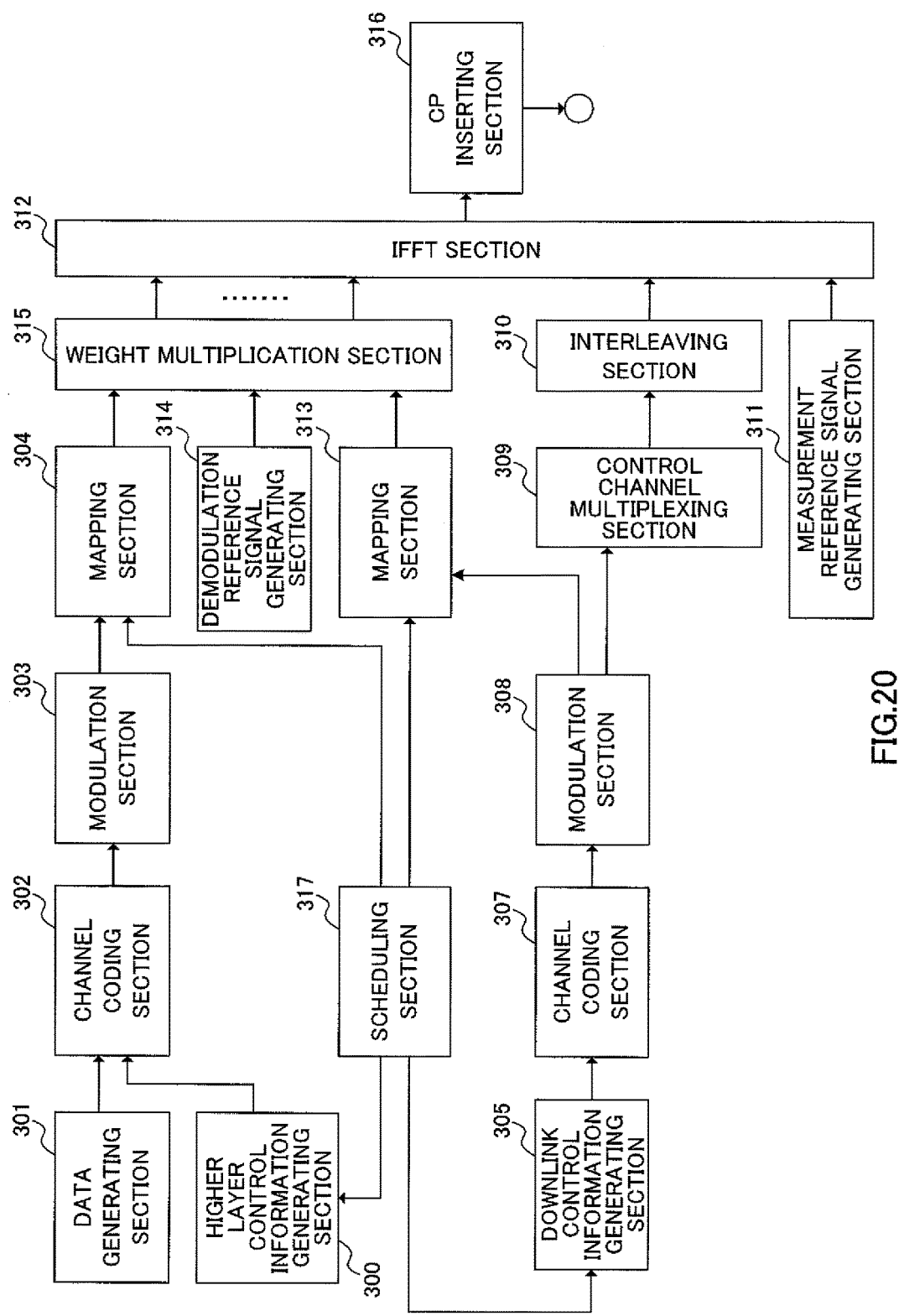
FIG. 20 is a functional block diagram corresponding to a baseband processing section in a radio base station.

FIG. 20 is a function structure diagram of the baseband signal processing section 104 provided in the radio base station 10 according to the present embodiment, and part of the higher layers. Note that, although FIG. 20 primarily shows downlink (transmitting) functional configurations, the radio base station 10 may have uplink (receiving) functional configurations as well.

As illustrated in FIG. 20, the radio base station 10 has a higher layer control information generating section 300, a data generating section 301, a channel coding section 302, a modulation section 303, a mapping section 304, a downlink control information generating section 305, a channel coding section 307, a modulation section 308, a control channel multiplexing section 309, an interleaving section 310, a measurement reference signal generating section 311, an IFFT section 312, a mapping section 313, a demodulation reference signal generating section 314, a weight multiplication section 315, a CP inserting section 316 and a scheduling section 317. Note that, when the radio base station 10 is a radio base station 12 to form a small cell C2, the control channel multiplexing section 309 and the interleaving section 310 may be omitted.

The higher layer control information generating section 300 generates higher layer control information on a per user terminal 20 basis. Also, the higher layer control information is control information that is sent by higher layer signaling (for example, RRC signaling), and includes, for example, parameter information (PDSCH RE mapping and quasi-co-location configuration), CIF and PQI configuration information (cif_Presence, pqi_Presence) and so on.

The data generating section 301 generates downlink user data on a per user terminal 20 basis. The downlink user data that is generated in the data generating section 301 and the higher layer control information that is generated in the higher layer control information generating section 300 are input in the channel coding section 302 as downlink data to be transmitted in the PDSCH. The channel coding section 302 performs channel coding of the downlink data for each user terminal 20 in accordance with coding rates that are determined based on feedback information from each user terminal 20. The modulation section 303 modulates the downlink data having been subjected to channel coding in accordance with modulation schemes that are determined based on feedback information from each user terminal 20. The mapping section 304 maps the modulated downlink data in accordance with commands from the scheduling section 317.

The downlink control information generating section 305 generates downlink control information (DCI) on a per user terminal 20 basis. The downlink control information includes PDSCH allocation information (DL assignments), PUSCH allocation information (UL grants) and so on. The downlink control information generating section 305 generates the downlink control information by including indicators to represent parameter information, by using a predetermined DCI format (for example, DCI format 2D), depending on the mode of communication with the user terminals.

When, for example, the number of CCs that employ CoMP is equal to or less than a predetermined number, the downlink control information generating section 305 generates downlink control information by using the CIF bits as a parameter information indicator (Alt. 1, reusing CIF). Also, when the number of such CCs is greater than the predetermined number, the downlink control information generating section 305 configures both the bit field for the CC indicator (CIF) and the bit field for the PQI, and generates downlink control information (Alt. 2, CIF+PQI).

The downlink control information that is generated in the downlink control information generating section 305 and the common control information that is generated in the shared control is input in the channel coding sections 307 as downlink control information to be transmitted in the PDCCH or the enhanced PDCCH. The channel coding sections 307 performs channel coding of the downlink control information received as input, in accordance with coding rates designated by the scheduling section 317, which will be described later. The modulation sections 308 modulate the downlink control information after channel coding in accordance with modulation schemes designated by the scheduling section 317.

Here, the downlink control information to be transmitted in the PDCCH is input from the modulation sections 308 into the control channel multiplexing section 309 and multiplexed. The downlink control information that is multiplexed in the control channel multiplexing section 309 is interleaved in the interleaving section 310. The interleaved downlink control information is input in the IFFT section 312, with measurement downlink reference signals (CSI-RSs, CRSs and so on) generated in the measurement reference signal generating section 311.

Meanwhile, the downlink control information that is transmitted in the enhanced PDCCH is input from the modulation sections 308 into the mapping section 313. The mapping section 313 maps the downlink control information in accordance with commands from the scheduling section 317, which will be described later.

The mapped downlink control information is input in the weight multiplication section 315, with the downlink data to be transmitted in the PDSCH (that is, the downlink data mapped in the mapping section 304) and the demodulation downlink reference signals (DM-RSs) generated in the demodulation reference signal generating section 314. The weight multiplication section 315 multiplies the downlink data to be transmitted by the PDCSH, the downlink control information to be transmitted by the enhanced PDCCH, and the demodulation downlink reference signals, by user terminal 20-specific precoding weights, and pre-codes them. The pre-coded transmission data is input in the IFFT section 312, and converted from frequency domain signals to time sequence signals through an inverse fast Fourier transform. Cyclic prefixes (CPs) to function as guard intervals are inserted in the output signals from the IFFT section 312 by the CP inserting section 316, and the signals are output to the transmitting/receiving sections 103.

The scheduling section 317 allocates radio resources to the downlink user data to be transmitted in the PDSCH, the downlink control information to be transmitted in the enhanced PDCCH, and the downlink control information to be transmitted in the PDCCH. To be more specific, the scheduling section 317 allocates radio resources based on command information from the higher station apparatus 30 (for example, information related to the mode of communication with the user terminals) and feedback information from each user terminal 20 (for example, CSI (Channel State Information), which includes CQIs (Channel Quality Indicators), RIs (Rank Indicators) and so on).

With the present embodiment, the scheduling section 317 functions as a control section that controls whether or not to configure the PQI and the CIF based on the mode of communication in the user terminals (for example, based on at least one of whether or not CoMP is employed, the mode of CoMP transmission, the number of CoMP CCs and whether or not the CIF is configured). Also, the scheduling section (control section) 317 commands the higher layer control information generating section 300 to configure or not configure the PQI and the CIF, generate parameter information, and so on. Also, it is equally possible to designate the parameter information indicators to be contained in the downlink control information to the downlink control information generating section 305.

Also, with the present embodiment, the higher layer control information generating section 300 generates parameter information, CIF and PQI configuration information (cif_Presence, pqi_Presence) and so on. These pieces of information are reported to the user terminal 20 by higher layer signaling (for example, RRC signaling).

Figure 21:
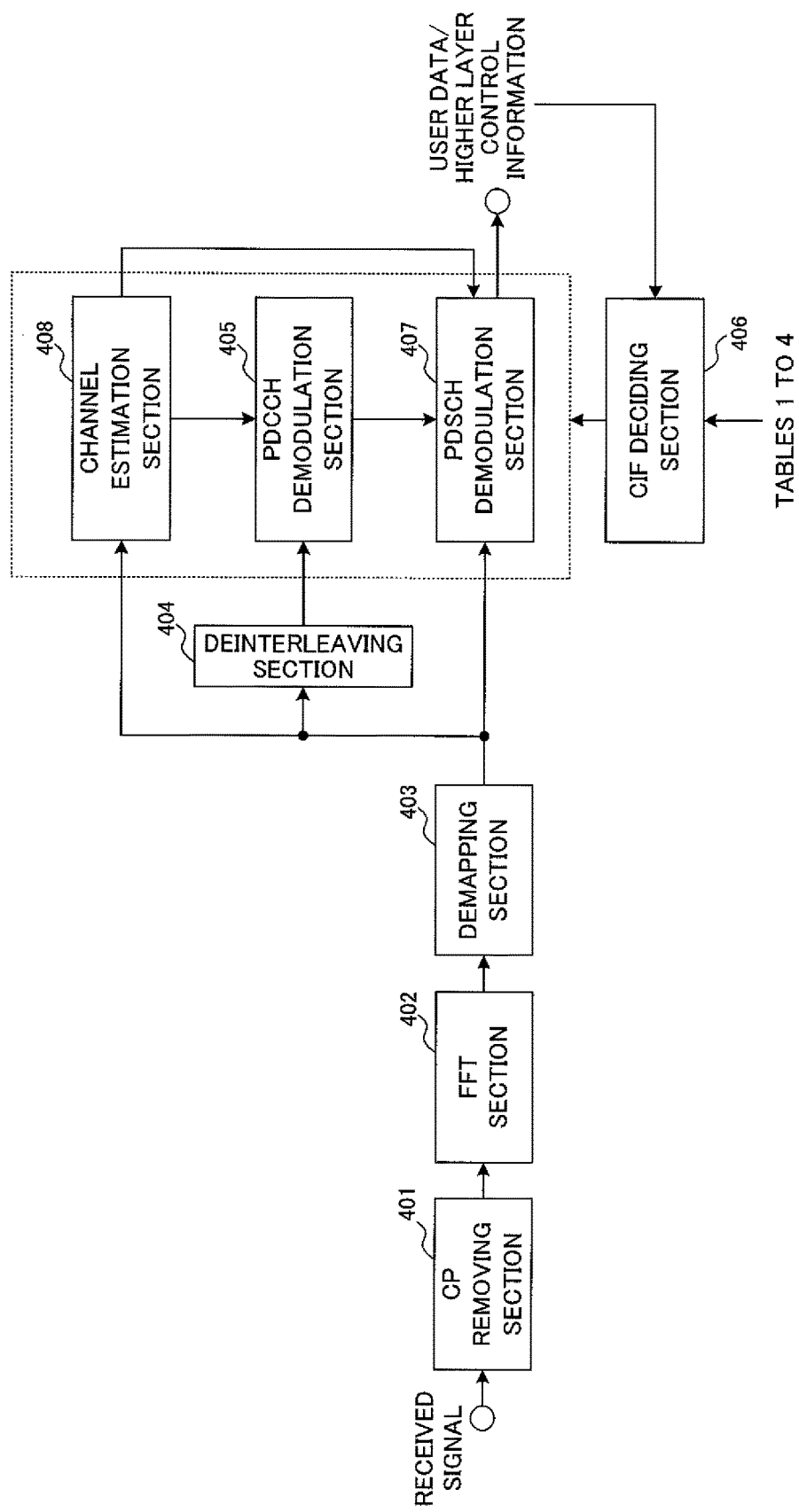
FIG. 21 is a functional block diagram corresponding to a baseband processing section in a user terminal.

FIG. 21 is a function structure diagram of the baseband signal processing section 204 provided in the user terminal 20. The user terminal 20 has, as downlink (receiving) functional configurations, a CP removing section 401, an FFT section 402, a demapping section 403, a deinterleaving section 404, a PDCCH demodulation section 405, a CIF deciding section 406, a PDSCH demodulation section 407 and a channel estimation section 408.

Downlink signals received from the radio base station 10 as received data have the cyclic prefixes (CPs) removed in the CP removing section 401. The downlink signals, from which the CPs have been removed, are input in the FFT section 402. The FFT section 402 performs a fast Fourier transform (FFT) of the downlink signals, converts the time domain signals into frequency domain signals, and inputs these signals in the demapping section 403. The demapping section 403 demaps the downlink signals. Note that the demapping process in the demapping section 403 is performed based on higher layer control information that is input from the application section 205. Downlink control information that is output from the demapping section 403 is deinterleaved in the deinterleaving section 404.

The PDCCH demodulation section 405 performs blind decoding, demodulation, channel decoding and so on of the downlink control information (DCI) output from the deinterleaving section 404, based on the results of channel estimation in the channel estimation section 408, which will be described later.

When the CIF is configured in the downlink control information that is received, the CIF deciding section (selection section) 406 selects a predetermined table from a plurality of tables (for example, Tables 1 to 4) that lay out the contents to be represented by the CIF bits. For example, the CIF deciding section 406 can select a predetermined table based on at least one of whether or not the bit field for the PQI is configured (pqi_Presence: True/False), the mode of transmission, the number of CSI processes and the number of PDSCH resource mapping states (parameter information) (see above FIG. 13 to FIG. 15). The user terminal determines the parameter information (PDSCH RE mapping and quasi-co-location configuration) based on the table selected in the CIF deciding section 406 and performs receiving processes. By this means, even when downlink signals are transmitted from a plurality of transmission points to a user terminal, it is possible to carry out receiving processes adequately by taking into account the rate matching, quasi-co-location relationship and so on in each downlink signal.

The PDSCH demodulation section 407 performs demodulation, channel decoding and so on of the downlink data output from the demapping section 403, based on the results of channel estimation in the channel estimation section 408. To be more specific, the PDSCH demodulation section 407 demodulates the PDSCH allocated to the subject user terminal based on the downlink control information demodulated in the PDCCH demodulation section 405, and acquires the downlink data (downlink user data and higher layer control information) for the subject user terminal.

The channel estimation section 408 performs channel estimation using the demodulation downlink reference signals (DM-RSs), measurement downlink reference signals (CRSs and CSI-RSs) and so on. The channel estimation section 408 outputs the result of channel estimation by the measurement downlink reference signals (CRSs and CSI-RSs) to the PDCCH demodulation section 405. Meanwhile, the channel estimation section 408 outputs the result of channel estimation by the demodulation downlink reference signals (DM-RSs) to the PDSCH demodulation section 407.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. For example, it is possible to employ a plurality of examples described above in appropriate combinations. Consequently, the descriptions herein are provided only for the purpose of explaining examples, and should by no means be construed to limit the present invention in any way.

The disclosure of Japanese Patent Application No. 2012-248789, filed on Nov. 12, 2012, including the specification, drawings and abstract, is incorporated herein by reference in its entirety.

The invention claimed is:

1. A user terminal that receives downlink signals transmitted from a plurality of transmission points, the user terminal comprising:
  a receiver that receives given downlink control information (DCI) including PDSCH RE Mapping and Quasi-Co-Location Indicator (PQI) on a downlink control channel and receives Carrier Indicator Field (CIF) configuration information indicating whether CIF is configured in the DCI by higher layer signaling; and
  a processor that performs a receiving process of a downlink signal based on the DCI,
  wherein, when the CIF configuration information indicates that the CIF is configured in the DCI, the processor performs the receiving process based on the PQI and CIF contained in the DCI, and when the CIF configuration information indicates that the CIF is not configured in the DCI, the processor performs the receiving process based on the PQI contained in the DCI.

2. The user terminal according to claim 1, wherein the processor uses the PQI contained in the DCI as a basis to determine a resource to allocate a Physical Down/ink Shared Channel (PDSCH) and/or Quasi co-location relationship between downlink signals.

3. The user terminal according to claim 1, wherein the given DCI is DCI format 2D.

4. A radio base station that constitutes one transmission point and communicates with a user terminal that receives downlink signals transmitted from a plurality of transmission points, the radio base station comprising:
- a processor that generates given downlink control information (DCI) including PDSCH RE Mapping and Quasi-Co-Location Indicator (PQI) and Carrier Indicator Field (CIF) configuration information indicating whether CIF is configured in the DCI; and
- a transmitter that transmits the given DCI to the user terminal on a downlink control channel and transmits the CIF configuration information to the user terminal by higher layer signaling,
- wherein, when the CIF configuration information indicates that the CIF is configured in the DCI, a receiving process is performed in the user terminal based on the PQI and CIF contained in the DCI, and when the CIF configuration information indicates that the CIF is not configured in the DCI, the receiving process is performed in the user terminal based on the PQI contained in the DCI.

5. A radio communication system comprising: a plurality of transmission points and a user terminal that receives downlink signals transmitted from the plurality of transmission points, wherein
- a radio base station that constitutes one of the plurality of transmission points comprises:
  - a first processor that generates given downlink control information (DCI) including PDSCH RE Mapping and Quasi-Co-Location Indicator (PQI) and Carrier Indicator Field (CIF) configuration information indicating whether CIF is configured in the DCI; and
  - a transmitter that transmits the given DCI to the user terminal on a downlink control channel and transmits the CIF configuration information to the user terminal by higher layer signaling,
- the user terminal comprises:
  - a receiver that receives the DCI on the downlink control channel and receives the CIF configuration information by higher layer signaling; and
  - a processor that performs a receiving process of a downlink signal based on the DCI,
  - wherein, when the CIF configuration information indicates that the CIF is configured in the DCI, the processor performs the receiving process based on the PQI and CIF contained in the DCI, and when the CIF configuration information indicates that the CIF is not configured in the DCI, the processor performs the receiving process based on the PQI contained in the DCI.

6. A radio communication method in a user terminal that receives downlink signals transmitted from a plurality of transmission points, the radio communication method comprising:
- receiving given downlink control information (DCI) including PDSCH RE Mapping and Quasi-Co-Location Indicator (PQI) on a downlink control channel and receiving Carrier Indicator Field (CIF) configuration information indicating whether CIF is configured in the DCI by higher layer signaling; and
- performing a receiving process of a downlink signal based on the given DCI,
- wherein, when the CIF configuration information indicates that the CIF is configured in the DCI, the user terminal performs the receiving process based on the PQI and CIF contained in the DCI, and when the CIF configuration information indicates that the CIF is not configured in the DCI, the user terminal performs the receiving process based on the PQI contained in the DCI.

7. The user terminal according to claim 2, wherein the given DCI is DCI format 2D.

8. The user terminal according to claim 1, wherein when a coordinated transmission mode does not require Quasi-Co-Location information indicated by the PQI, the processor preforms the receiving process without using the Quasi-Co-Location.

9. The user terminal according to claim 1, wherein when the user terminal is configured with a plurality of CSI processes, the processor controls to receive the given DCI including the PQI.

10. The user terminal according to claim 9, wherein the processor selects a table to use for reading a bit field of the DCI depending on a number of CSI processes as configured.

* * * * *